(12) United States Patent
Kume

(10) Patent No.: US 9,233,475 B2
(45) Date of Patent: Jan. 12, 2016

(54) UMBILICAL MEMBER ATTACHMENT DEVICE OF ROBOT

(71) Applicant: FANUC CORPORATION, Minamitsuru-gun, Yamanashi (JP)

(72) Inventor: Hirokazu Kume, Yamanashi (JP)

(73) Assignee: FANUC CORPORATION, Minamitsuru-Gun, Yamanashi (JP)

( * ) Notice: Subject to any disclaimer, the term of this patent is extended or adjusted under 35 U.S.C. 154(b) by 49 days.

(21) Appl. No.: 14/036,713

(22) Filed: Sep. 25, 2013

(65) Prior Publication Data
US 2014/0083229 A1   Mar. 27, 2014

(30) Foreign Application Priority Data

Sep. 26, 2012   (JP) ................. 2012-212283

(51) Int. Cl.
| | |
|---|---|
| *B25J 19/00* | (2006.01) |
| *H02G 11/00* | (2006.01) |
| *F16L 3/01* | (2006.01) |
| *F16L 3/22* | (2006.01) |
| *H02G 3/32* | (2006.01) |

(52) U.S. Cl.
CPC ............. *B25J 19/00* (2013.01); *B25J 19/0025* (2013.01); *F16L 3/01* (2013.01); *F16L 3/22* (2013.01); *H02G 11/00* (2013.01); *H02G 3/32* (2013.01); *Y10S 901/27* (2013.01); *Y10T 74/20311* (2015.01)

(58) Field of Classification Search
CPC ........ B25J 18/00; B25J 19/06; B25J 19/0029; B25J 17/02; B25J 17/0266; B25J 19/0025; B25J 9/104; B25J 18/06; Y10S 901/23; Y10S 901/27; H02G 15/00; F16L 3/02; F16L 3/22; F16L 3/23; F16L 3/26
USPC ............... 74/490.01, 490.02, 490.03, 490.07; 901/23, 27; 248/68.1, 71, 73, 74.4
See application file for complete search history.

(56) References Cited

U.S. PATENT DOCUMENTS

| | | | | |
|---|---|---|---|---|
| 2,880,949 | A | * | 4/1959 | Fuss ................................ 248/70 |
| 4,705,243 | A | | 11/1987 | Hartmann |
| 5,606,235 | A | * | 2/1997 | Mauletti ....................... 318/625 |
| 5,769,365 | A | * | 6/1998 | Onishi et al. .................... 248/49 |
| 5,816,736 | A | | 10/1998 | Kroulik |

(Continued)

FOREIGN PATENT DOCUMENTS

| | | |
|---|---|---|
| CN | 1744971 | 3/2006 |
| DE | 3434899 | 5/1985 |

(Continued)

*Primary Examiner* — William Kelleher
*Assistant Examiner* — Jude Agendia
(74) *Attorney, Agent, or Firm* — RatnerPrestia

(57) ABSTRACT

An umbilical member attachment device including a base part attached detachably to a first member and a second member of a robot, the first member and the second member rotating relative to each other; a first fastening part attached to the base part to fasten the first umbilical member; and a second fastening part attached to the base part to fasten the second umbilical member. The second fastening part has an attachment member attached to the base part and a fastening member fastening the second umbilical member to the attachment member, and the attachment member is provided detachably from the base part together with the second umbilical member in a state where the first umbilical member is fastened by the first fastening part.

8 Claims, 24 Drawing Sheets

(56) References Cited

U.S. PATENT DOCUMENTS

| | | | |
|---|---|---|---|
| 6,250,174 B1* | 6/2001 | Terada et al. | 74/490.02 |
| 7,253,578 B2 | 8/2007 | Kumagai | |
| 8,109,170 B2* | 2/2012 | Jinushi et al. | 74/490.01 |
| 8,708,288 B2 | 4/2014 | Oosawa | |
| 8,720,295 B2* | 5/2014 | Long et al. | 74/490.02 |
| 2005/0172606 A1 | 8/2005 | Wehler | |
| 2007/0120022 A1* | 5/2007 | Trotter et al. | 248/49 |
| 2008/0092689 A1 | 4/2008 | Shiraki | |
| 2012/0067157 A1* | 3/2012 | Suzuki et al. | 74/490.02 |
| 2012/0111135 A1* | 5/2012 | Ichibangase et al. | 74/490.06 |
| 2013/0098190 A1* | 4/2013 | Pan | 74/490.02 |
| 2014/0013893 A1* | 1/2014 | Asano et al. | 74/490.02 |

FOREIGN PATENT DOCUMENTS

| | | |
|---|---|---|
| DE | 19649491 | 8/1997 |
| DE | 20022990 | 8/2002 |
| DE | 10211212 | 9/2003 |
| DE | 10216081 | 10/2003 |
| DE | 102007009850 | 9/2008 |
| EP | 1464456 | 11/2011 |
| JP | 04180293 | 6/1992 |
| JP | H05-014767 | 2/1993 |
| JP | H08-197482 | 8/1996 |
| JP | 2003-117878 | 4/2003 |
| JP | 2004-136371 | 5/2004 |
| JP | 2004179243 | 6/2004 |
| JP | 2007044767 | 2/2007 |
| JP | 2010064232 | 3/2010 |
| JP | 2011054816 | 3/2011 |
| JP | 2011-161571 | 8/2011 |
| WO | WO 2009/069389 A1 | 6/2009 |

* cited by examiner

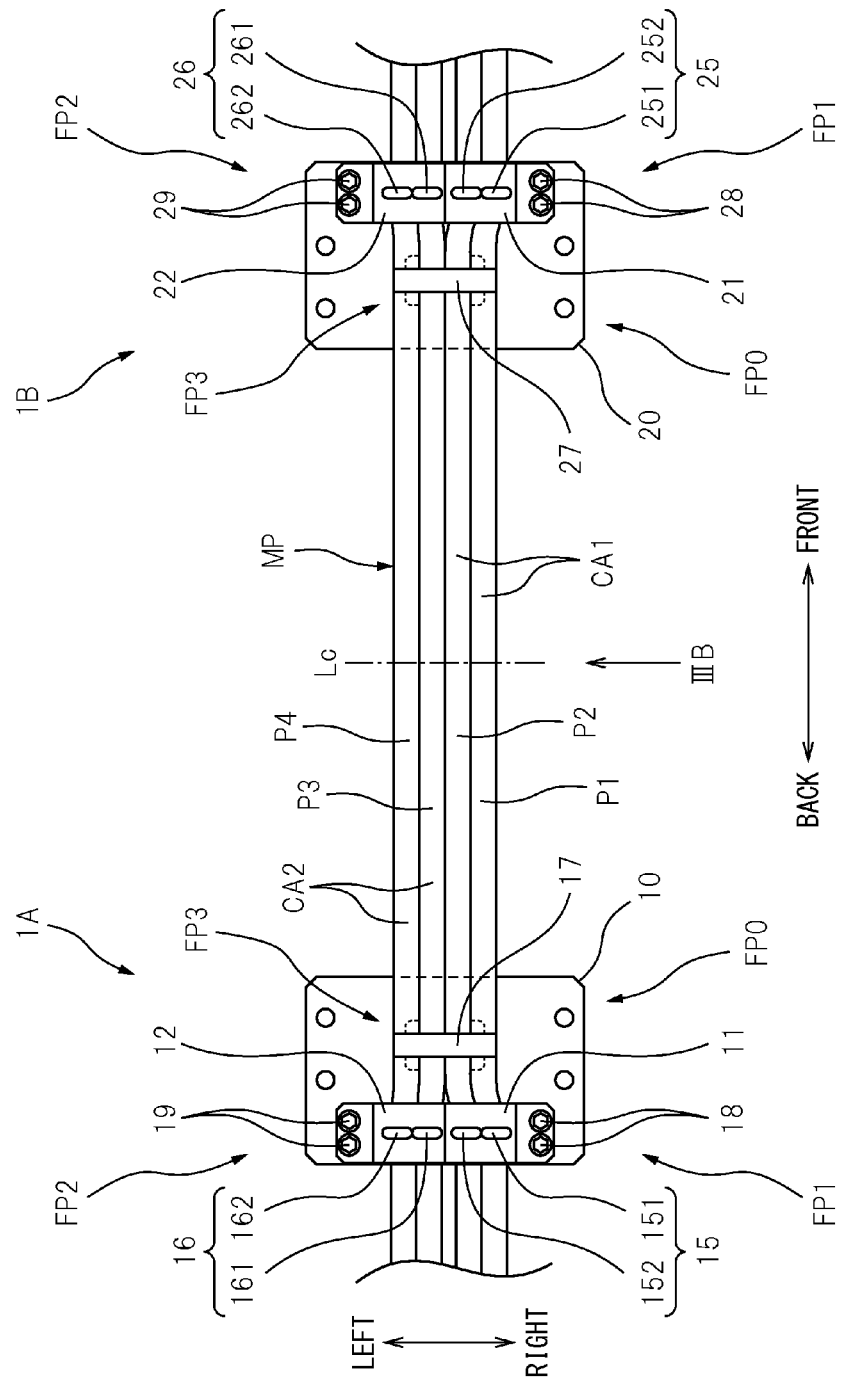

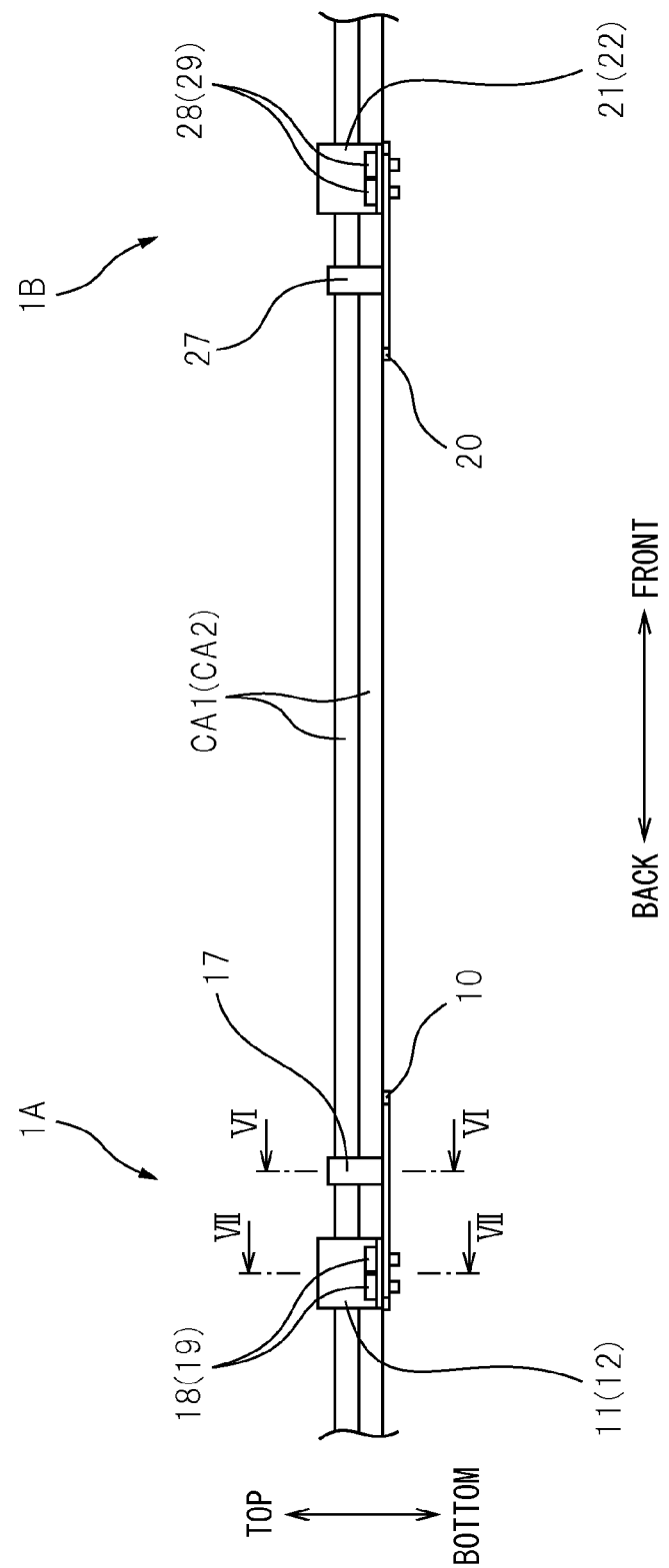

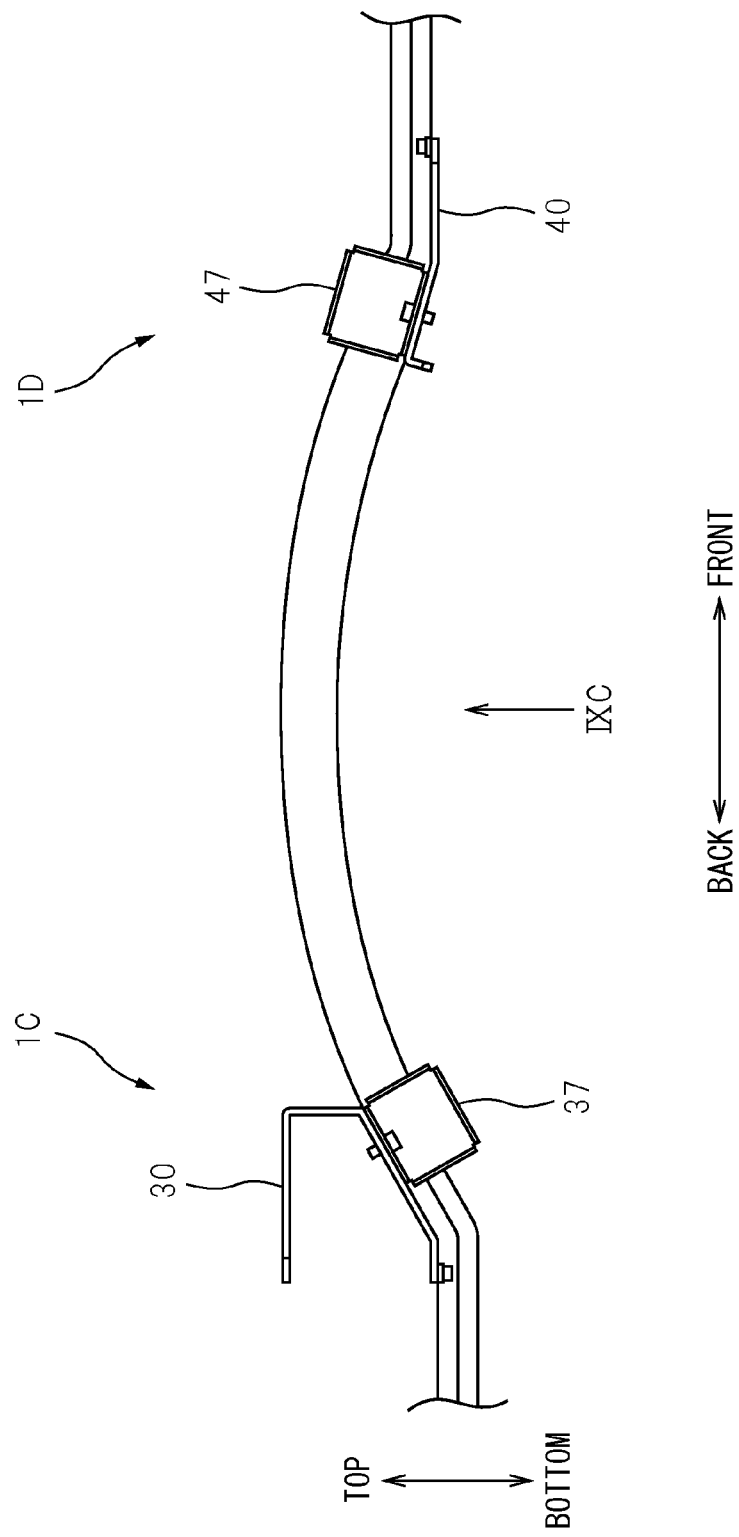

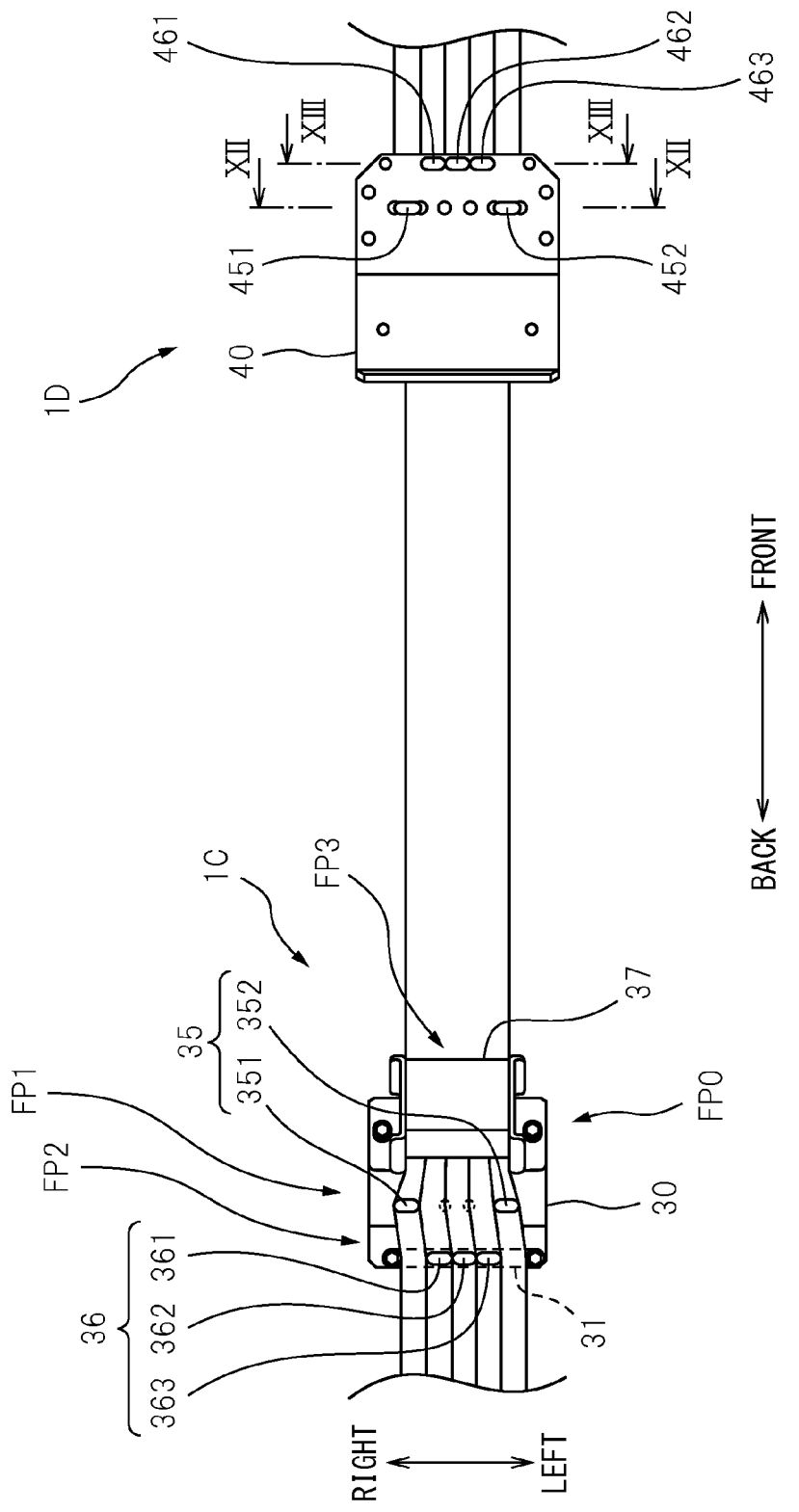

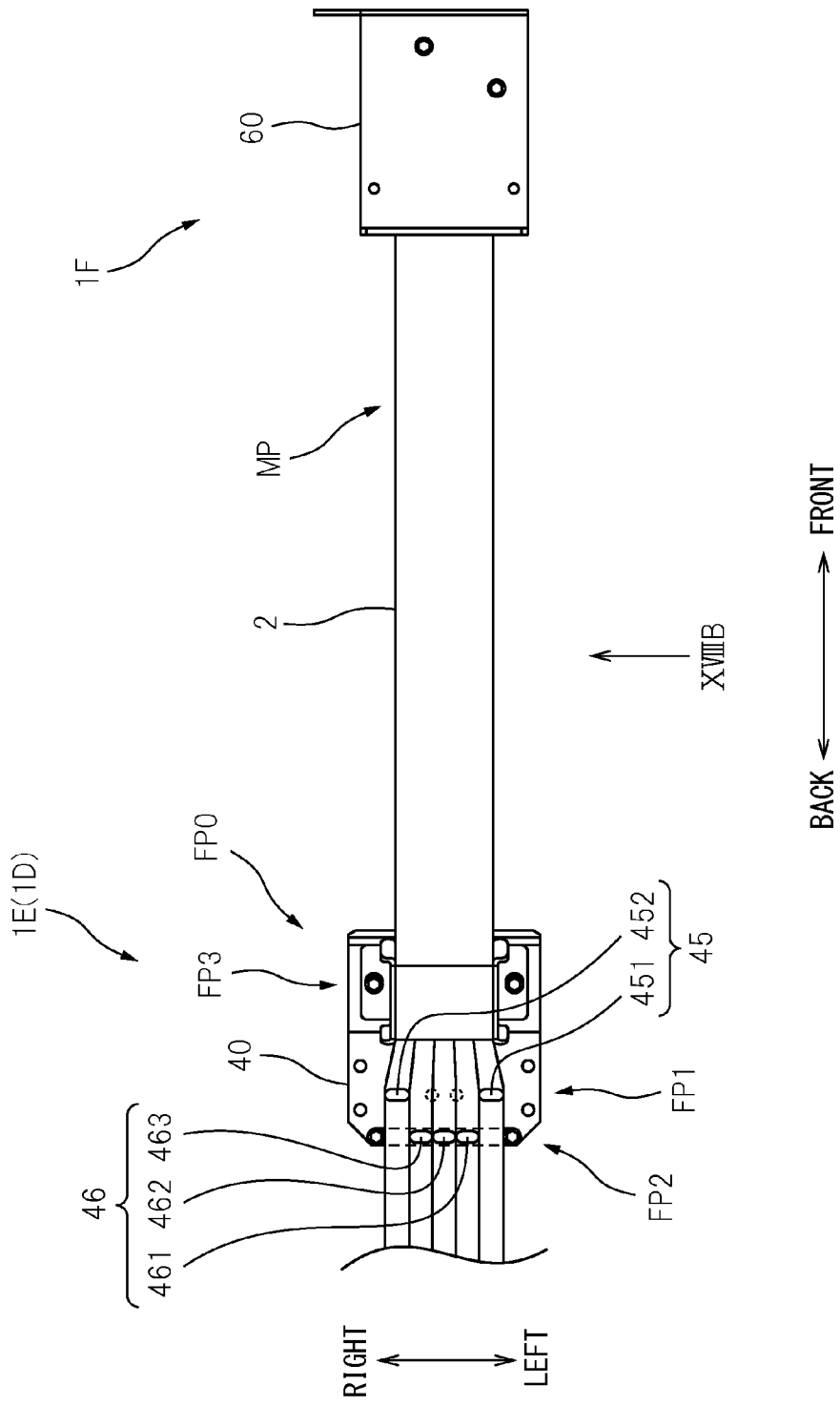

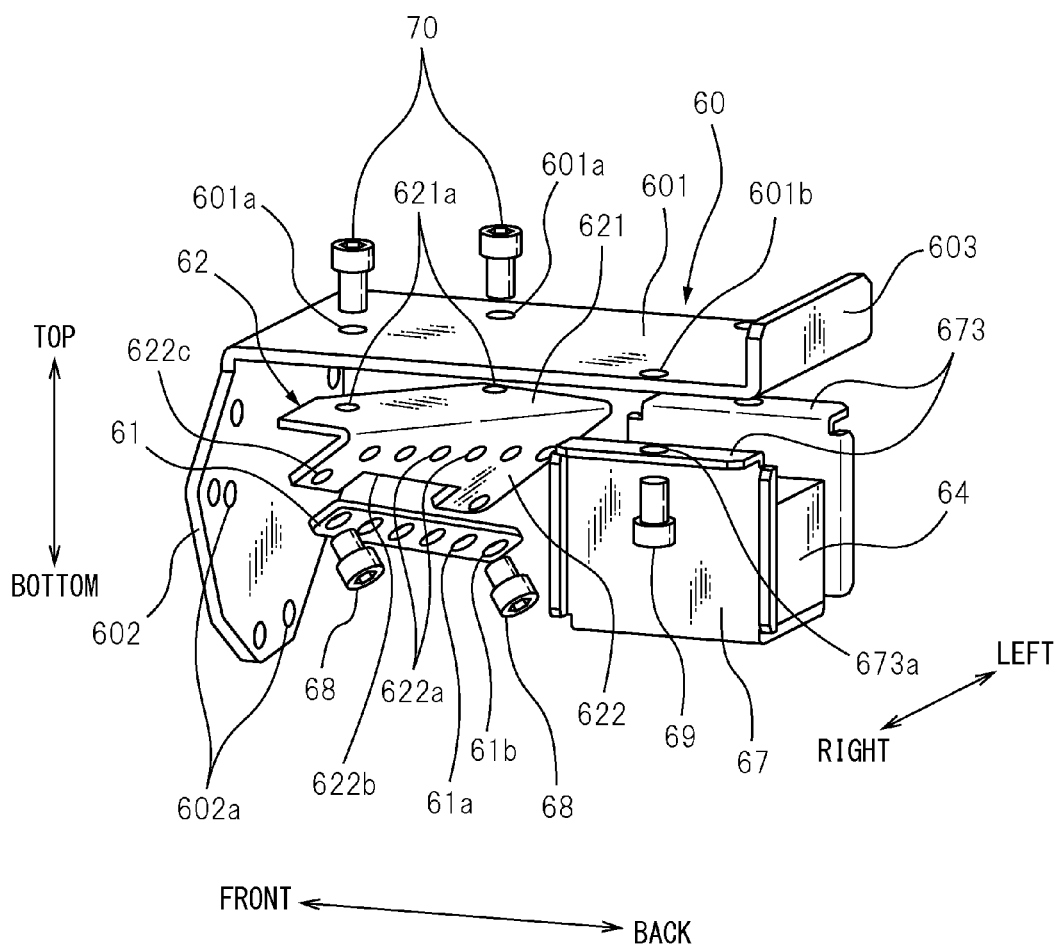

UMBILICAL MEMBER ATTACHMENT DEVICE OF ROBOT

BACKGROUND OF THE INVENTION

1. Field of the Invention

The present invention relates to an umbilical member attachment device which attaches wires, tubes, or other umbilical members to a robot and to a robot which has an umbilical member attachment device.

2. Description of the Related Art

In the past, a multiarticulated robot in which a plurality of umbilical members are laid in a flexible manner are known. In the robot described in, for example, International Publication No. WO2009/069389 (WO2009/069389A1), a plurality of umbilical members are divided into robot umbilical members required for driving the robot and tool umbilical members required for the gun, etc. which are attached to the front end of the robot. These umbilical members are bent into U-shapes and are fastened by separate clamps or are fastened by the same clamps to moving parts of the robot which rotate relative to each other (a first upper arm and a second upper arm).

However, in a configuration like the robot described in WO2009/069389A1 where a plurality of umbilical members are fastened by separate clamps, the number of umbilical members increases. For this reason, when detaching all umbilical members from the robot, there are many locations for detachment of the clamps, and so the work is troublesome. Further, in a configuration where a plurality of umbilical members are fastened by the same clamps, for example, when replacement of some umbilical members becomes necessary, all umbilical members have to be detached from the robot, and so the work of replacement becomes complicated.

SUMMARY OF THE INVENTION

One aspect of the present invention is a umbilical member attachment device for attaching a plurality of umbilical members to a robot, the robot having a first member and a second member which rotate relative to each other, the plurality of umbilical members including a first umbilical member and a second umbilical member and having movable portions movable between the first member and the second member. This umbilical member attachment device includes a base part attached detachable to the first member and the second member, a first fastening part attached to the base part to fasten the first umbilical member, and a second fastening part attached to the base part to fasten the second umbilical member. The second fastening part has an attachment member attached to the base part and a fastening member fastening the second umbilical member to the attachment member, and the attachment member is provided detachably from the base part together with the second umbilical member in a state where the first umbilical member is fastened by the first fastening part.

BRIEF DESCRIPTION OF THE DRAWINGS

The object, features, and advantages of the present invention will become much clearer from the following explanation of embodiments given with reference to the attached drawings. In the attached drawings, FIG. 3A is a plan view which shows the configuration of the umbilical member attachment devices of a first specific example of the present invention, FIG. 3B is a side view which shows the configuration of the umbilical member attachment devices of the first specific example of the present invention, FIG. 9B is a side view which shows the configuration of the umbilical member attachment devices of the second specific example of the present invention, FIG. 9C is a back view which shows the configuration of the umbilical member attachment devices of the second specific example of the present invention, FIG. 18A is a plan view which shows the configuration of the umbilical member attachment devices of a third specific example of the present invention, FIG. 19 is a disassembled perspective view of a second umbilical member attachment device of FIG. 18A.

DETAILED DESCRIPTION

Figure 1A:
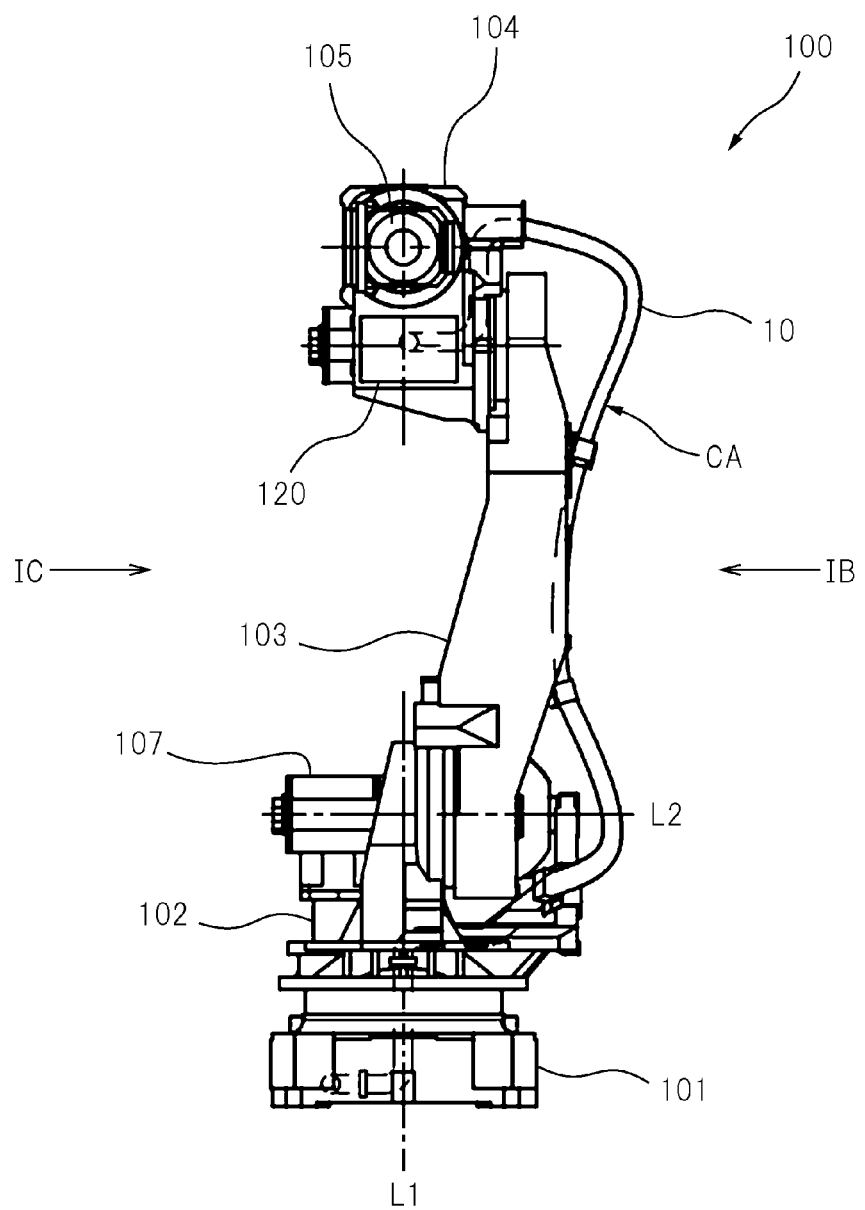
FIG. 1A is a front view of a robot according to an embodiment of the present invention.
Figure 1B:
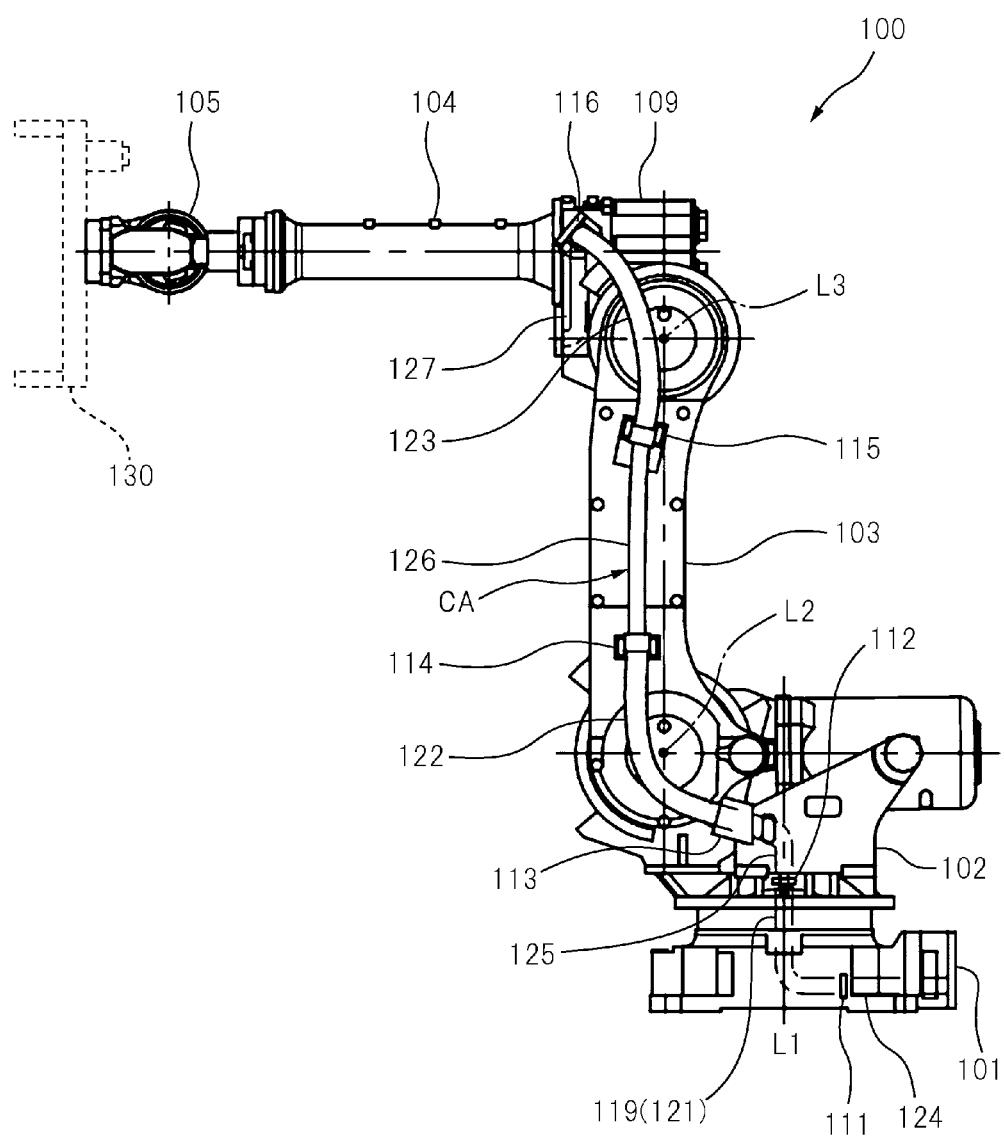
FIG. 1B is a right side view of the robot according to the embodiment of the present invention.
Figure 1C:
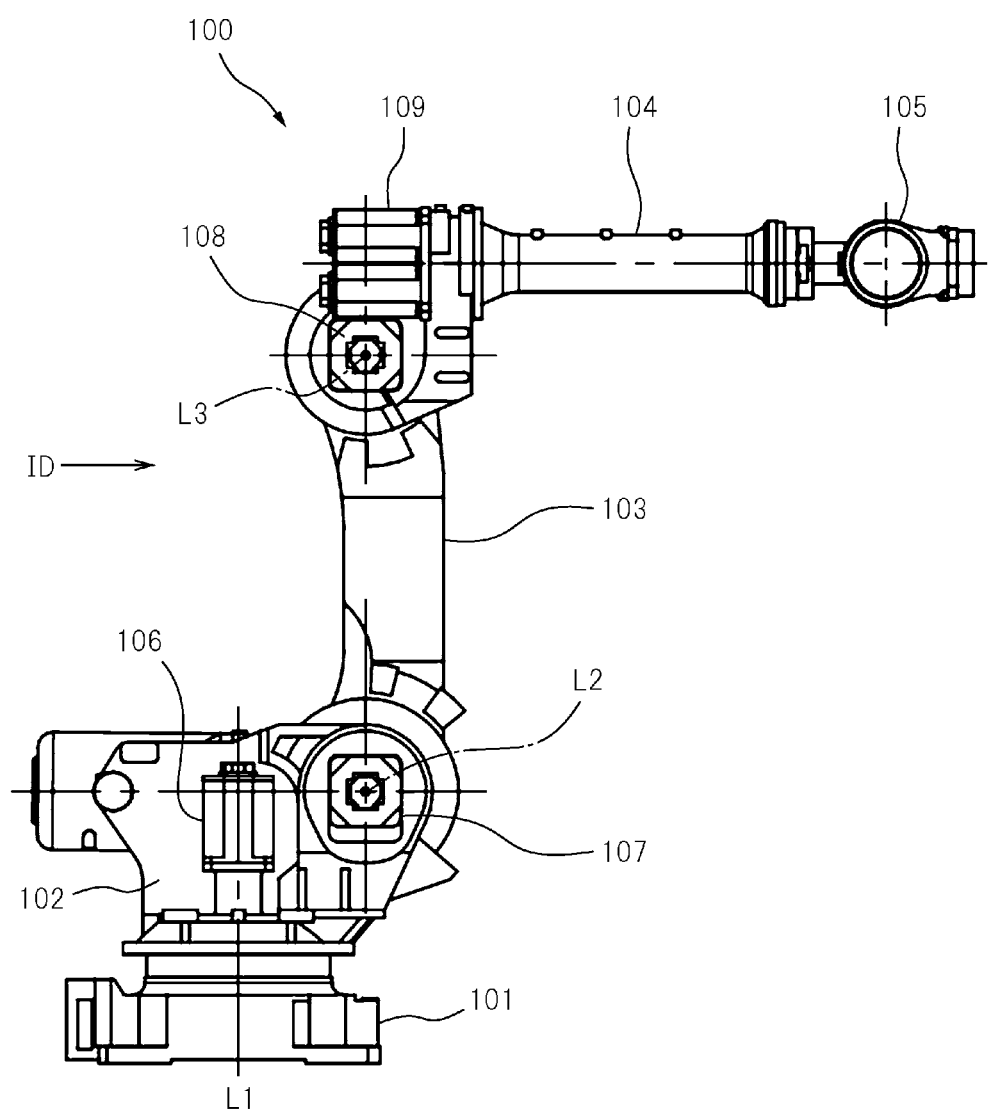
FIG. 1C is a left side view of the robot according to the embodiment of the present invention.
Figure 1D:
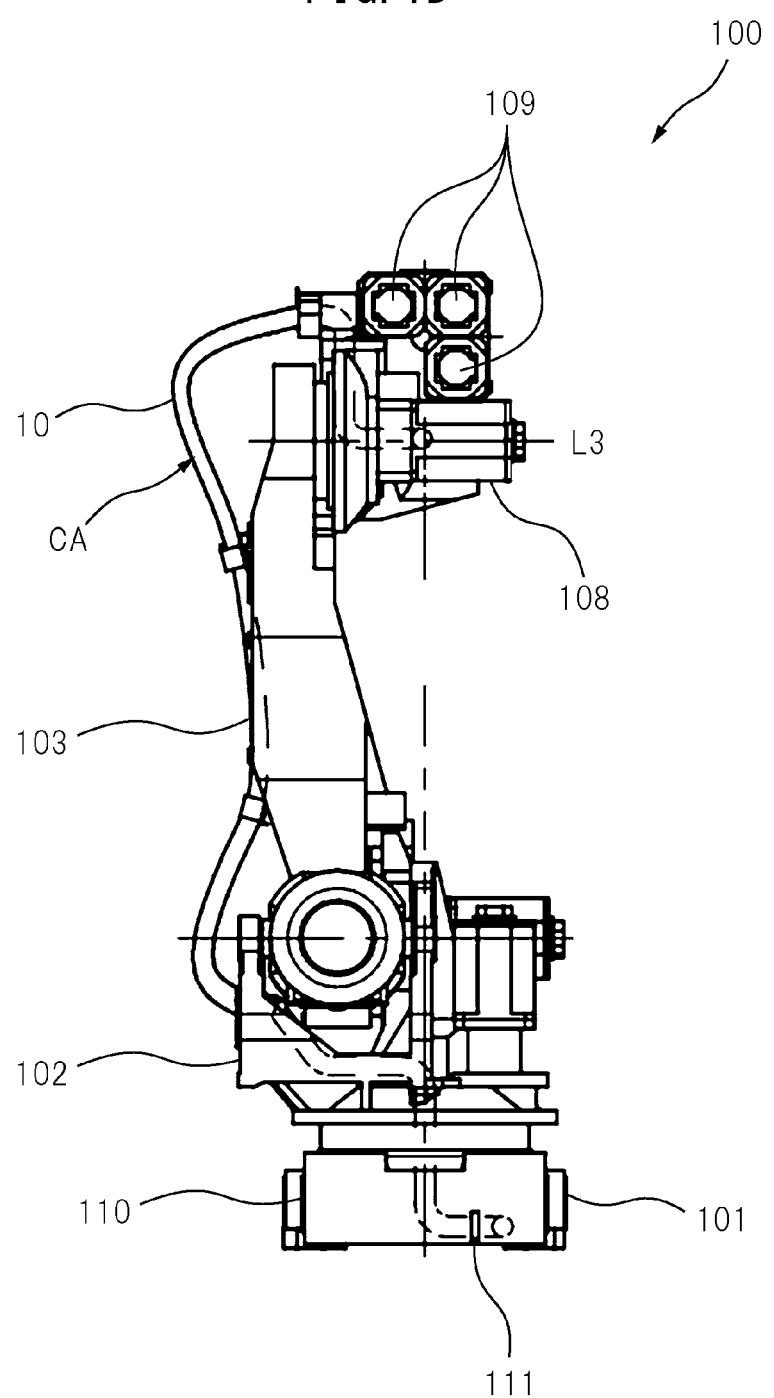
FIG. 1D is a back view of the robot according to the embodiment of the present invention.

Below, referring to FIG. 1A to FIG. 20B, umbilical member attachment devices according to embodiments of the present invention will be explained. First, the configuration of a robot to which umbilical member attachment devices according to the present embodiments are applied will be explained. FIG. 1A to FIG. 1D are views which show the configuration of an industrial robot 100 according to an embodiment of the present invention. In particular, FIG. 1A is a front view of a robot 100, FIG. 1B is a right side view of the robot 100 (view along arrow IB of FIG. 1A), FIG. 1C is a left side view of the robot 100 (view along arrow IC of FIG. 1A), and FIG. 1D is a back view of the robot 100 (view along arrow ID of FIG. 1C).

As shown in FIG. 1A to FIG. 1D, the robot 100 has a base 101, a swivel 102 provided above the base 101 to swivel about an axial line L1 which extends in a vertical direction, a bottom arm 103 supported at the swivel 102 rotatably about an axial line L2 which extends in a horizontal direction, a top arm 104 supported at a front end of the bottom arm 130 rotatably about an axial line L3 which extends in the horizontal direction, and a wrist part 105 provided at the front end of the top arm 104. The wrist part 105 has various end effectors 130 attached to it in accordance with the nature of the work. FIG. 1B shows an example of an end effecter 130 by a broken line. While not shown, the cables and cable laying devices and relay boxes, etc. from the distribution board 120 to the end effecter 130 are together called the "end effecter 130".

The swivel 102 mounts a servo motor 106 along the axial line L1. The swivel 102 is driven by the servo motor 106 to swivel with respect to the base 101. The swivel 102 mounts a servo motor 107 along the axial line L2. The bottom arm 103 is driven by the servo motor 107 to swing with respect to the swivel 102 in the front-back direction. At the base end of the top arm 104, a servo motor 108 is mounted along the axial line L3. The top arm 104 is driven by the servo motor 108 to swing with respect to the bottom arm 103 in the front-back direction. At the base end of the top arm 104, a plurality of (in the figure, three) servo motors 109 are mounted. The wrist part 105 is driven by these servo motors 109 to operate. The servo motors 106 to 109 are robot drive motors.

As shown in FIG. 1B, the robot 100 has a plurality of umbilical members CA (hereinafter, also referred to as the "cable") laid in a bunch from the base 101 to the swivel 102, bottom arm 103, and top arm 104. The umbilical members CA are the general term for wires, tubes, etc. and include power lines to the servo motors 106 to 109 and various signal wires and other wires, and tubes for feeding liquids or gases, etc. The umbilical members CA are laid deformably by flexing or deformably by twisting at the moving parts of the robot 100 at the mount of the base 101, the mount of the swivel 102, the mount of the bottom arm 103, the mount of the top arm 104, and other sections to keep from being excessively tensed at the time of operation of the robot 100.

That is, the umbilical members CA are fastened at a fastening part 111 of the base 101, a fastening part 112 and fastening part 113 of the swivel 102, a fastening part 114 and fastening part 115 of the top arm 103, and a fastening part 116 of the bottom arm 104. The base 101 and the base end of the top arm 104 are provided with respective distribution boards 110 and 120. The ends of the umbilical members CA are connected to the respective distribution boards 110 and 120 (FIG. 1A and FIG. 1D) or servo motors 106 to 109.

Between the base 101 and the swivel 102, a pipe member 119 (pipe part) is provided along the axial line L1. The umbilical members CA are run through the inside of the pipe member 119. The sections between the fastening part 111 and the fastening part 112 form the moving parts 121 of the umbilical members CA. The sections between the fastening part 113 and the fastening part 114 and the sections between the fastening part 115 and fastening part 116 respectively form the moving parts 122 and 123 of the umbilical members CA. On the other hand, at the sections between the distribution board 110 and the fastening part 111, the sections between the fastening part 112 and the fastening part 113, the sections between the fastening part 114 and the fastening part 115, and the sections between the fastening part 116 and the distribution board 120, there are no moving parts of the robot 100. At these portions, the umbilical members CA constitute nonmoving parts 124 to 127. Part of the umbilical members CA are branched off midway and connected to the servo motors. For example, at the nonmoving parts 125, the power lines and signal wires of the servo motors 106 and 107 are branched off. At the nonmoving parts 127, the power lines and signal wires of the servo motors 108 and 109 are branched off.

In this regard, such a plurality of umbilical members CA can be classified into a plurality of basic cables CA1 which include power lines and signal wires corresponding to the robot drive servo motors 106 to 109 and a plurality of option cables CA2 which include power lines and signal wires for driving the end effecters (see FIG. 3A). The option cables CA2 are cables which are suitably replaced in accordance with the application of use of the robot 100 and include not only end effector drive cables, but also FA network cables (CC-Link cables, device net cables, PROFIBUS cables, etc.) and tubes, etc.

In a robot 100 which has basic cables CA1 and option cables CA2, for example, when changing the application of use of the robot 100, sometimes the basic cables CA1 are left attached as they are while only the option cables CA2 are replaced. In this case, if the fastening parts 111 to 116 fasten the basic cables CA1 and the option cables CA2 together, at the time of replacement of cables, not only the option cables CA2, but also the basic cables CA1 are detached, so replacement of the option cables CA2 is troublesome. On the other hand, if the fastening parts 111 to 116 fasten the basic cables CA1 and the option cables CA2 separately, not only does the fastening space of the cables CA1 and CA2 increase, but also when both the basic cables CA1 and the option cables CA2 have to be detached, troublesome work is involved. Therefore, in the present embodiment, the following such umbilical member attachment devices 1 are used to attach the umbilical members CA to the robot 100.

Figure 2A:
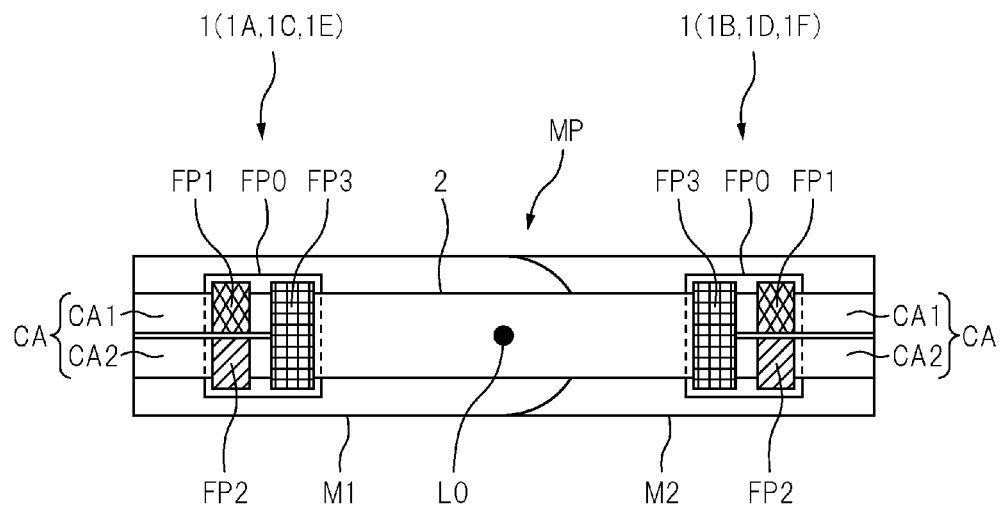
FIG. 2A is a view which schematically shows the general configuration of umbilical member attachment devices according to an embodiment of the present invention.
Figure 2B:
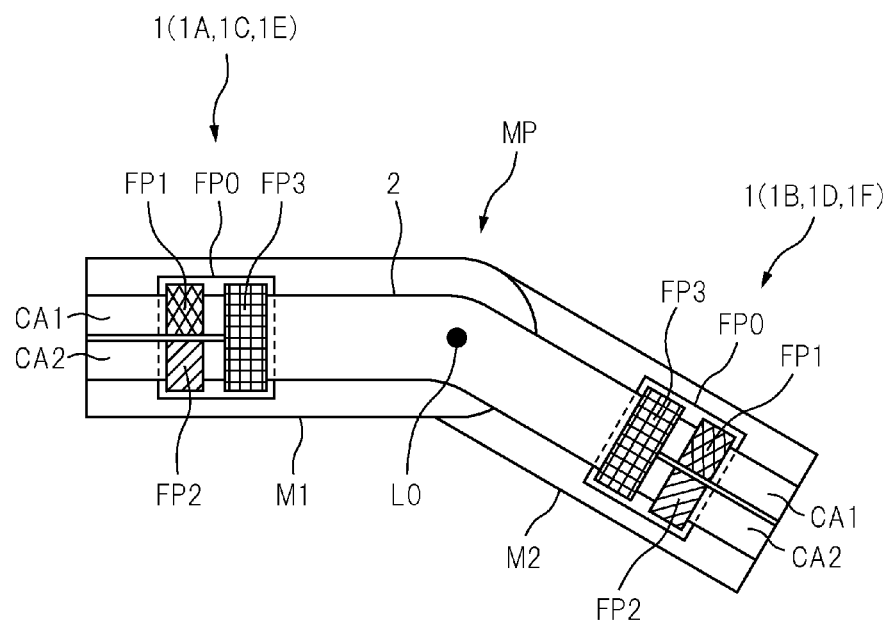
FIG. 2B is a view which schematically shows the general configuration of umbilical member attachment devices according to the embodiment of the present invention

The umbilical member attachment devices 1 can be respectively provided at pairs of fastening parts (111 and 112, 113 and 114, and 115 and 116) which are arranged straddling the moving parts 121 to 123. FIG. 2A and FIG. 2B are views which schematically show the general configuration of umbilical member attachment devices 1 according to the present embodiment and show different postures at the moving parts of the robot 100. Below, for convenience, component members of the robot 100 which can swivel about the axial line L0 will be called a "first member M1" and a "second member M2". The first member M1 and the second member M2 are respectively provided with umbilical member attachment devices 1 (later explained first umbilical member attachment devices 1A, 1C, and 1E and second umbilical member attachment devices 1B, 1D, and 1F) in the explanations. In FIG. 2A and FIG. 2B, the moving parts of the umbilical members CA are expressed by "MP".

As shown in FIG. 2A and FIG. 2B, each of the first umbilical member attachment devices 1A, 1C, and 1E has a base part FP0 attached detachably to the first member M1, a first fastening part FP1 which fastens basic cables CA1 on the base part FP0, a second fastening part FP2 which fastens option cables CA2, and a third fastening part FP3 which fastens both the basic cables CA1 and the option cables CA2. Each of the second umbilical member attachment devices 1B, 1D, and 1F similarly has a base part FP0 attached detachably to the second member M2, a first fastening part FP1 which fastens basic cables CA1 on the base part FP0, a second fastening part FP2 which fastens option cables CA2, and a third fastening part FP3 which fastens both the basic cables CA1 and the option cables CA2.

The basic cables CA1 and the option cables CA2 are arranged on the base part FP0. The first fastening part FP1, second fastening part FP2, and third fastening part FP3 are provided detachably at the base part FP0. The third fastening part FP3 is arranged at the axial line L0 side from the first fastening part FP1 and the second fastening part FP2. The inside of a pair of third fastening parts FP3 corresponds to the moving parts MP of the umbilical members CA. The moving parts MP are, in some locations, covered by a cable cover 2.

In the thus configured umbilical member attachment devices 1, by detaching the first fastening parts FP1 and third fastening parts FP3 from the base parts FP0, the basic cables CA1 can be detached from the first member M1 and second member M2. Further, by detaching the second fastening parts FP2 and third fastening parts FP3 from the base parts FP0, the option cables CA2 can be detached from the first member M1 and second member M2. Furthermore, by detaching the base parts FP0 from the first member M1 and the second member M2, the basic cables CA1 and the option cables CA2 can be detached from the first member M1 and second member M2. By detaching the first fastening parts FP1, second fastening parts FP2, and third fastening parts FP3 from the base parts FP0 as well, it is possible to detach the basic cables CA1 and the option cables CA2 from the first member M1 and second member M2.

First Specific Example

The configuration of the above umbilical member attachment devices 1 will be explained more specifically. First, specific examples of the umbilical member attachment device 1A which is provided at the fastening part 111 of FIG. 1B (first umbilical member attachment device) and the umbilical member attachment device 1B which is provided at the fastening part 112 (second umbilical member attachment device) will be explained. The umbilical member attachment devices 1A and 1B are applied to moving parts 121 between the base 101 and the swivel 102 of the robot 100. That is, the first member M1 corresponds to the base 101, while the second member M2 corresponds to the swivel 102.

FIG. 3A is a plan view which shows the configuration of the umbilical member attachment devices 1A and 1B of the first specific examples, while FIG. 3B is a view of a side view (arrow 111B of FIG. 3A). Below, for convenience sake, as shown in FIG. 3A and FIG. 3B, the front-back direction (length direction), left-right direction (width direction), and top-bottom direction (height direction) are defined and the configurations of the parts are explained in accordance with this definition. The front-back direction is a direction parallel to the longitudinal direction of the cables CA, the left-right direction is a direction parallel to the mounting surface of the base part FP0 and vertical to the longitudinal direction of the cables CA, and the top-bottom direction is a direction vertical to the mounting surface of the base part FP0 and vertical to the longitudinal direction of the cables CA. In FIG. 3A and FIG. 3B, illustration of the first member M1 and the second member M2 is omitted. Although the umbilical members CA are run through the inside of the pipe member 119, illustration of the pipe member 119 is omitted in FIG. 3A and FIG. 3B.

As shown in FIG. 3A and FIG. 3B, the umbilical members CA extend in the front-back direction. The basic cables CA1 and the option cables CA2 are laid in two lines each in the top-bottom direction and the left-right direction. That is, there are respectively four basic cables CA1 and option cables CA2 and there are eight umbilical members CA as a whole. If defining the positions of the four umbilical members CA in the left-right direction in FIG. 3A as the "first position P1", "second position P2", "third position P3", and "fourth position P4", two basic cables CA1 each are arranged at the first position P1 and second position P2 and two option cables CA2 each are arranged at the third position P3 and fourth position P4.

The first fastening part FP1 and second fastening part FP2 of first umbilical member attachment device 1A are laid above the base part FP0 in the left-right direction, while the third fastening part FP3 is provided at the front of the first fastening part FP1 and the second fastening part FP2. The first fastening part FP1 and second fastening part FP2 of the second umbilical member attachment device 1B are laid above the base part FP0 in the left-right direction, while the third fastening part FP3 is provided at the back of the first fastening part FP1 and second fastening part FP2.

The base part FP0 of the first umbilical member attachment device 1A has a base plate 10. The first fastening part FP1 of the first umbilical member attachment device 1A has a first bracket 11 and a left and right pair of fastening bands 15 (151, 152). The second fastening part FP2 of the first umbilical member attachment device 1A has a second bracket 12 and a left and right pair of fastening bands 16 (161, 162). The third fastening part FP3 of the first umbilical member attachment device 1A has a fastening band 17.

In the same way as the first umbilical member attachment device 1A, the base part FP0 of the second umbilical member attachment device 2A has a base plate 20. The first fastening part FP1 of the second umbilical member attachment device 1B has a first bracket 21 and a left and right pair of fastening bands 25 (251, 252). The second fastening part FP2 of the second umbilical member attachment device 1B has a second bracket 22 and a left and right pair of fastening bands 26 (261, 262). The third fastening part FP3 of the second umbilical member attachment device 2A has a fastening band 27.

Figure 4:
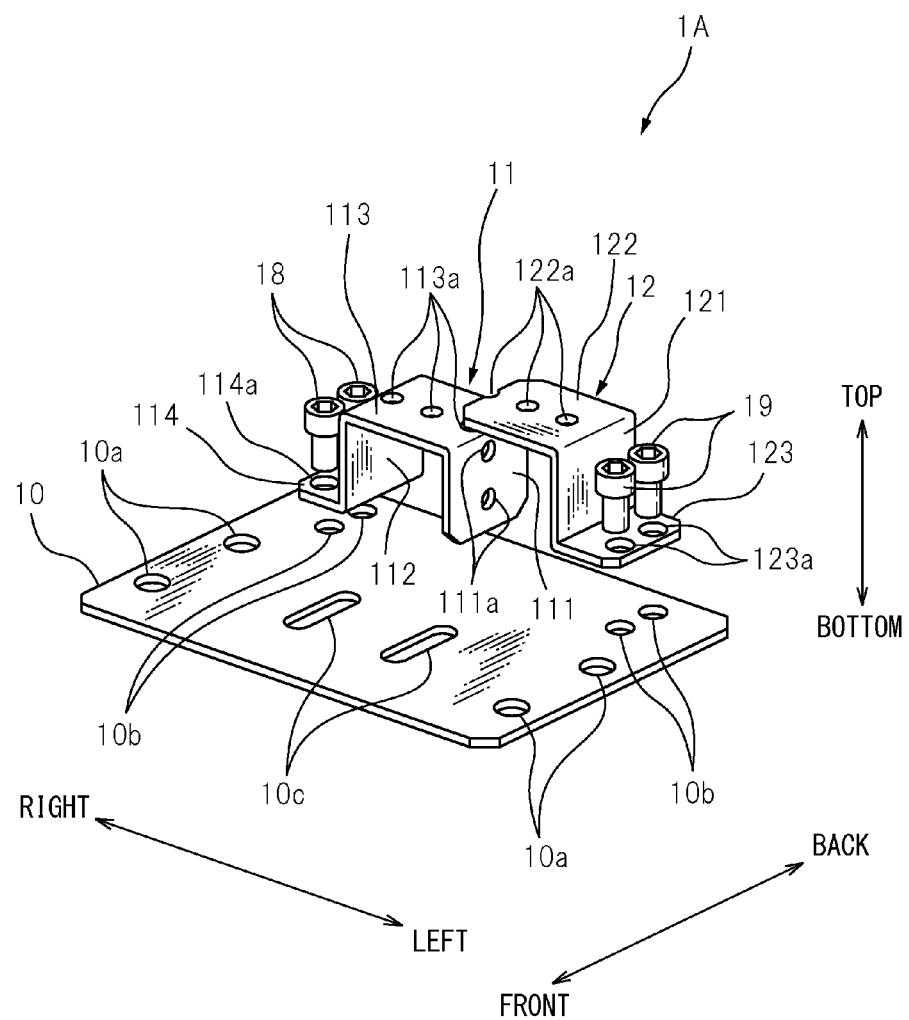
FIG. 4 is a disassembled perspective view of a first umbilical member attachment device of FIG. 3A.
Figure 5:
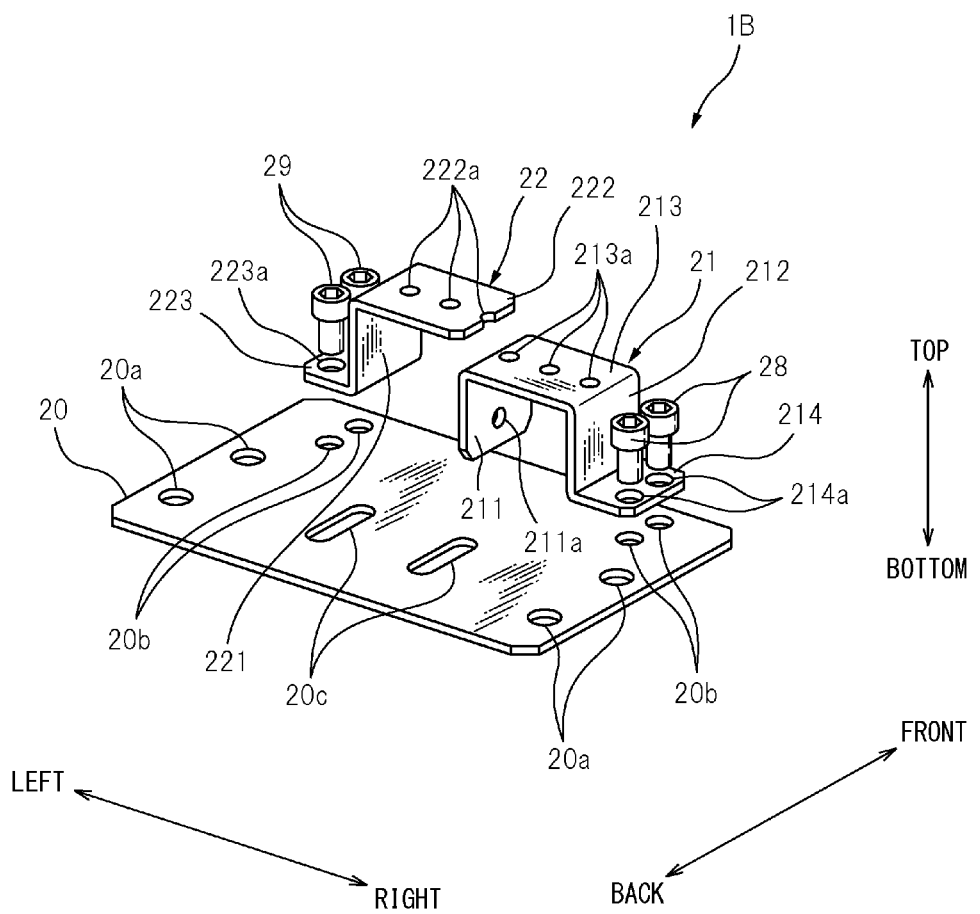
FIG. 5 is a disassembled perspective view of a second umbilical member attachment device of FIG. 3A.

FIG. 4 is a disassembled perspective view of the first umbilical member attachment device 1A, while FIG. 5 is a disassembled perspective view of the second umbilical member attachment device 1B. In FIG. 4 and FIG. 5, illustration of the fastening bands 15 to 17 and 25 to 27 is omitted.

As shown in FIG. 4, the base plate 10 is a substantially rectangular shaped flat plate. At its two left and right ends, pairs of front and back through holes 10a are formed for attaching the base plate 10 to the first member M1. At the back of the left and right through holes 10a, pairs of front and back screw holes 10b are formed for attachment of brackets 11 and 12. At the inside of the through holes 10a in the left-right direction, a left and right pair of through holes 10c through which a fastening band 17 is passed are formed. The through holes 10c correspond to the width of a fastening band 17 (front-back direction length) and are long holes which are elongated in the front-back direction.

A first bracket 11 is comprised of a rectangular shaped flat plate which has a fixed length in the front-back direction and is bent at right angles at predetermined portions. That is, the first bracket 11 has a left and right pair of vertical plate parts 111 and 112 which extend in the top-bottom direction, a horizontal plate part 113 which connects the top ends of the vertical plate parts 111 and 112, and a flange part 114 which extends from the bottom end of the right side vertical plate part 112 to the right. The boundaries of the vertical plate parts 111 and 112 and horizontal plate part 113 and of the vertical plate part 112 and flange part 114 may also be joined by welding to form the first bracket 11.

The horizontal plate part 113 is formed with a plurality of through holes (three) 113a, through which fastening bands 15 are inserted, separated from each other in the left-right direction. The left side vertical plate part 111 is formed with a plurality of through holes (two) 111a, through which fastening bands 15 are inserted, separated from each other in the top-bottom direction. The flange part 114 is formed with a plurality of through holes (two) 114a, through which bolts 18 are inserted, separated from each other in the front-back direction corresponding to the pair of front and back screw holes 10b at the right side of the base plate 10.

The second bracket 12 is comprised of a rectangular shaped flat plate which has the same front-back direction length as the first bracket 11 and is bent at right angles at predetermined portions. That is, the second bracket 12 has a vertical plate part 121 which extends in the top-bottom direction, a horizontal plate part 122 which extends from the top end of the vertical plate part 121 to the right, and a flange part 123 which extends from the bottom end of the vertical plate part 121 to the left. The boundaries of the vertical plate part 121 and horizontal plate part 122 and of the vertical plate part 121 and the flange part 123 may also be joined by welding, etc. to form the second bracket 12.

The horizontal plate part 122 is formed with a plurality of through holes (three) 122a, through which fastening bands 16 are inserted, separated from each other in the left-right direction. The flange part 123 is formed with a plurality of through holes (two) 123a, through which bolts 19 are inserted, separated from each other in the front-back direction corresponding to the pair of front and back screw holes 10b at the left side of the base plate 10.

The base plate 10 is attached to the first member M1 by inserting not shown bolts into the through holes 10a of the base plate 10 and screwing them into not shown screw holes which are provided at the first member M1. The first bracket 11 is fastened to the top surface of the base plate 10 by screwing the bolts 18 which were inserted through the through holes 114a of the flange part 114 into screw holes 10b of the base plate 10. The second bracket 12 is fastened to the top surface of the base plate 10 by screwing the bolts 19 which are inserted through the through holes 123a of the flange part 123 into screw holes 10b of the base plate 10. As shown in FIG. 3A, in the state where the first bracket 11 and the second bracket 12 are fastened to the base plate 10, the brackets are arranged adjoining each other in the left-right direction.

The second umbilical member attachment device 1B is configured line symmetrically with the first umbilical member attachment device 1A about a virtual line Lc (FIG. 3A) which passes through the center part of the moving parts MP of the umbilical members 10 in the front-back direction and extends in the left-right direction (FIG. 3A). Therefore, the configuration of the second umbilical member attachment device 1B is basically the same as the configuration of the first umbilical member attachment device 1A.

That is, as shown in FIG. 5, through holes 20a and screw holes 20b are formed at the two left and right sides of a substantially rectangular shaped base plate 20 and through holes 20c are formed at the center part. A first bracket 21 has a left and right pair of vertical plate parts 211 and 212, a horizontal plate part 213 which connects the top ends of the vertical plate parts 211 and 212, and a flange part 214 which extends from the bottom end of the right side vertical plate part 212 to the right. The horizontal plate part 213 is formed with through holes 213a, the left side vertical plate part 211 is formed with through holes 211a, and the flange part 214 is formed with through holes 214a.

The second bracket 22 has a vertical plate part 221, a horizontal plate part 222 which extends from the top end of the vertical plate part 221 to the right, and a flange part 223 which extends from the bottom end of the vertical plate part 221 to the left. The horizontal plate part 222 is formed with through holes 222a, while the flange part 223 is formed with through holes 223a.

The base plate 20 is attached to the second member M1 by inserting not shown bolts through the through holes 20a and screwing them into not shown screw holes which are provided at the second member M2. The first bracket 21 is fastened to the top surface of the base plate 20 by screwing bolts 28 which are inserted through the through holes 214a of the flange part 214 into the screw holes 20b of the base plate 20. The second bracket 22 is fastened to the top surface of the base plate 20 by screwing bolts 29 which are inserted through the through holes 223a of the flange part 223 into the screw holes 20b of the base plate 20. As shown in FIG. 3A, in the state where the first bracket 21 and the second bracket 22 are fastened to the base plate 20, the brackets are arranged adjoining each other in the left-right direction.

The base plate 10, first bracket 11, and second bracket 12 of the above first umbilical member attachment device 1A and base plate 20, first bracket 21, and second bracket 22 of the second umbilical member attachment device 1B differ only in mounting direction. Parts of the same specifications may be used. Further, the fastening bands 15 to 17 of the first umbilical member attachment device 1A and the fastening bands 25 to 27 of the second umbilical member attachment device 1B may also be parts of the same specifications. Therefore, the number of parts can be reduced.

In the state where the first brackets 11 and 21 and the second brackets 12 and 22 are attached to the base plates 10 and 20, the vertical plate parts 111 and 211 of the first brackets 11 and 21 are positioned at the left-right center parts. The first brackets 11 and 21 and the second brackets 12 and 22 are shaped symmetrically to the left-right with each other about the vertical plate parts 111 and 211. Therefore, the left-right positions of the first brackets 11 and 21 and the second brackets 12 and 22 may also be switched.

Figure 6:
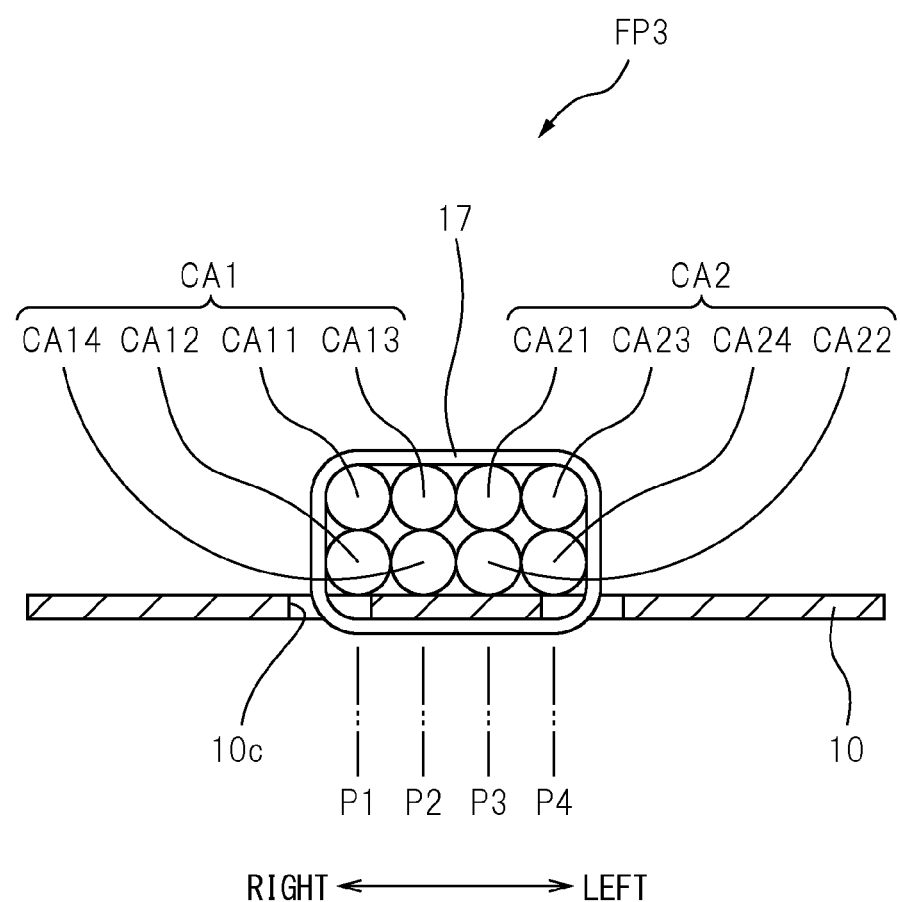
FIG. 6 is a cross-sectional view along the line VI-VI of FIG. 3B.
Figure 7:
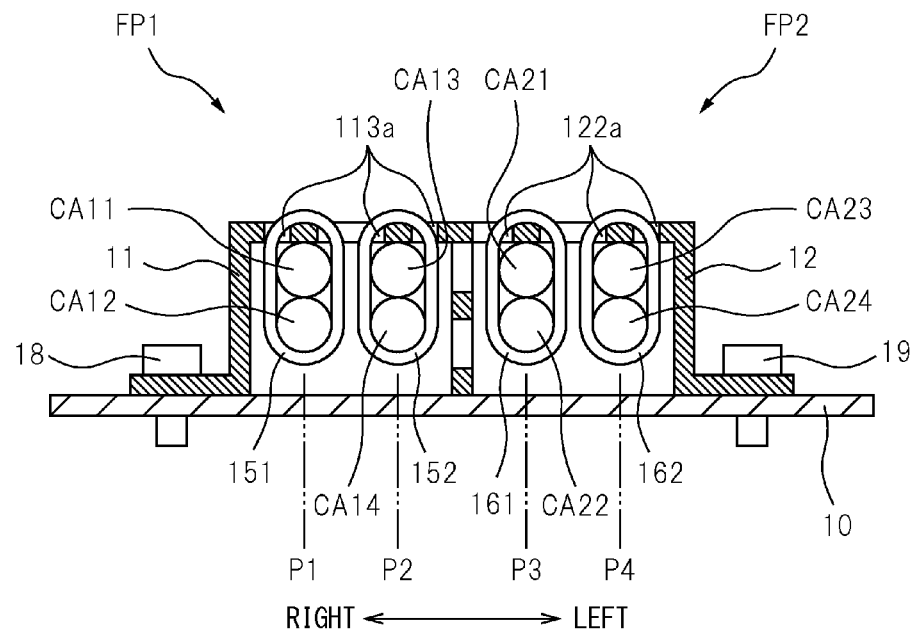
FIG. 7 is a cross-sectional view along the line VII-VII of FIG. 3B.

FIG. 6 is a cross-sectional view along the line VI-VI of FIG. 3B, while FIG. 7 is a cross-sectional view along the line VII-VII of FIG. 3B. As shown in FIG. 6, the fastening band 17 is inserted through the left and right pair of through holes 10c of the base plate 10 and surrounds the basic cables CA1 and option cables CA2 as a whole. The fastening band 17 imparts a fastening force to these cables CA1 and CA2 and fastens these cables CA1 and CA2 in the illustrated array on the top surface of the base plate 10.

That is, the basic cables CA11 and CA12 are fastened adjoining each other at the top and bottom at the first position P1, the basic cables CA13 and CA14 at the second position P2, the option cables CA21 and CA22 at the third position P3, and the option cables CA23 and CA24 at the fourth position P4. Although the fastening band 17 is connected at one end and the other end to impart a fastening force, illustration of the configuration of the ends of the fastening band 17 is omitted. The front-back direction length (width) of the fastening band 17 is longer than the front-back direction lengths of the fastening bands 15 and 16. For this reason, at the third fastening part FP3, the umbilical members CA can be fastened more firmly than at the first fastening part FP1 and the second fastening part FP2. Rather than form the fastening band 17 broad in width, it is also possible to increase the number of the fastening bands 17.

As shown in FIG. 7, the fastening band 151 is inserted through the right side and left-right center through holes 113a on the top surface of the first bracket 11 and surrounds the basic cables CA11 and CA12. Further, the fastening band 152 is inserted through the left side and left-right center through holes 113a on the top surface of the first bracket 11 and surrounds the basic cables CA13 and CA14. The fastening band 151 imparts a fastening force to the basic cables CA11 and CA12 and fastens these at the first position P1 at the inside surface of the first bracket 11 adjoining each other at the top and bottom. The fastening band 152 imparts a fastening force to the basic cables CA13 and CA14 and fastens these at the second position P2 at the inside surface of the first bracket 11 adjoining each other at the top and bottom. Although the fastening bands 151 and 152 are connected at one end and the other end to impart a fastening force, illustration of the configuration of the ends of the fastening bands 151 and 152 is omitted.

The fastening band 161 is inserted through the right side and left-right center through holes 122a on the top surface of the second bracket 12 and surrounds the option cables CA21 and CA22. Further, the fastening band 162 is inserted through the left side and left-right center through holes 122a on the top surface of the second bracket 12 and surrounds the option cables CA23 and CA24. The fastening band 161 imparts a fastening force to the option cables CA21 and CA22 and fastens these at the third position P3 at the inside surface of the second bracket 12 adjoining each other at the top and bottom. The fastening band 162 imparts a fastening force to the option cables CA23 and CA24 and fastens these at the fourth position P4 at the inside surface of the second bracket 12 adjoining each other at the top and bottom. Although the fastening bands 161 and 162 are connected at one end and the other end to impart a fastening force, illustration of the configuration of the ends of the fastening bands 161 and 162 is omitted.

The manner of fastening the basic cables CA1 and option cables CA2 by the second umbilical member attachment device 1B is similar to that which is shown in FIG. 6 and FIG. 7. Therefore, illustration of this point will be omitted.

A first specific example of the procedure when using the umbilical member attachment devices 1A and 1B to attach and detach umbilical members CA to and from a robot 100 (first member M1 and second member M2) will be explained. First, not shown bolts are used to attach the base plates 10 and 20 to the first member M1 (base 101) and second member M2 (swivel 102). Next, the basic cables CA1 are fastened by the fastening bands 15 and 25 to the first brackets 11 and 21 and the option cables CA2 are fastened by the fastening bands 16 and 26 to the second brackets 12 and 22.

At this time, the basic cables CA1 and option cables CA2 are marked in advance at positions for fastening by the fastening bands 15 and 25 and fastening bands 12 and 22. The marking positions and fastening positions are aligned. As the marking method, there are the methods of using a marker to make marks on the umbilical members CA or wrapping tape around the umbilical members CA, etc.

Next, the first brackets 11 and 21 are fastened by bolts 18 and 28 to the base plates 10 and 20, and the second brackets 12 and 22 are fastened by bolts 19 and 29 to the base plates 10 and 20. Due to this, the basic cables CA1 are fastened by the first fastening part FP1 positioned at the first position P1 and second position P2, while the option cables CA2 are fastened by the second fastening part FP2 positioned at the third position P3 and fourth position P4.

Finally, the basic cables CA1 and option cables CA2 as a whole are fastened by the fastening bands 17 and 27 to the base plates 10 and 20. In this case, the basic cables CA1 are positioned and fastened at the first fastening part FP1, while the option cables CA2 are positioned and fastened at the second fastening part FP2. The cables CA1 and CA2 extend over the base plates 10 and 20 as they are without being changed in array. For this reason, at the third fastening part FP3, there is no need to position the cables CA1 and CA2. Attachment of the fastening bands 17 and 27 is easy. Note that, the work of attaching the base plates 10 and 20 to the first member M1 (base 101) and second member M2 (swivel 102) may be performed not at the start, but at the end as well. The above completes the attachment of the umbilical members CA.

If the robot 100 is operated in this state, the umbilical members CA can move at the moving parts MP (FIG. 3A). In this case, the fastening bands 17 and 27 at the both sides of the moving parts MP are formed broad in width, so the fastening force on the umbilical members CA is strong and the umbilical members CA can be stably fastened without the umbilical members CA shifting off position. The umbilical members CA are arranged in the spaces inside of the brackets 11, 12, 21, and 22, so damage to the umbilical members CA at the first fastening part FP1 and second fastening part FP2 can be prevented.

When a change in the application of use of the robot 100, etc. prompts detachment of the option cables CA2 (existing cables) from the robot 100 and attachment of separate option cables CA2 (replacement cables), first, the fastening bands 17 and 27 are detached from the base plates 10 and 20. Next, the bolts 19 and 29 are loosened and the second brackets 12 and 22 are detached from the base plates 10 and 20 together with the existing cables CA2. Furthermore, the fastening bands 16 and 26 are detached once to detach the existing cables CA2 from the second brackets 12 and 22, then the fastening bands 16 and 26 are used to fasten the replacement cables CA2 to the second brackets 12 and 22. If preparing in advance replacement cables CA2 fastened to replacement second brackets 12 and 22, the work of aligning the marking positions and fastening positions of the cables CA and the work of detaching the fastening bands 16 and 26 once and detaching the existing cables CA2 from the second brackets 12 and 22, then using the fastening bands 16 and 26 to fasten the replacement cables CA2 to the second brackets 12 and 22 can be omitted, so the replacement time can be shortened.

Finally, the second brackets 12 and 22 are fastened to the base members 10 and 20, then the cables as a whole are fastened by the fastening bands 17 and 27 to the base plates 10 and 20. Due to this, when attaching or detaching the option cables CA2, there is no need to detach the basic cables CA1 from the robot 100, so replacement of option cables CA2 etc. become easy. It is also possible to attach or detach just the basic cables CA1 in the state where the option cables CA2 are attached to the robot 100. In this case, opposite to what is explained above, it is possible to leave the second brackets 12 and 22 attached to the base plates 10 and 20 and just attach or detach the first brackets 11 and 21 to or from the base plates 10 and 20.

When detaching both the basic cables CA1 and the option cables CA2 from the robot 100, the bolts for fastening the base plates are loosened and the cables as a whole are detached from the first member M1 and second member M2 together with the base plates 10 and 20. Therefore, it is possible to easily detach the cables as a whole without detaching the fastening bands 15 to 17 and 25 to 27. After this, when again attaching the cables as a whole to the robot 100, it is sufficient to attach the base plates 10 and 20 to the first member M1 and second member M2. Attachment of the cables as a whole is also easy.

In the umbilical member attachment devices 1A and 1B of the first specific example, the fastening pattern of the umbilical member CA can be changed without changing the arrangement of the umbilical members CA. For example, part of the option cables CA2 can be fastened as basic cables CA1 to the first fastening part FP1. The umbilical members CA which are changed in fastening pattern in this way will be called "replacement cables CA3" here. The replacement cables CA3 are option cables CA2, etc. which can be used in common both before and after the application of use of the robot 100 is changed. For example, FA network cables (CC-Link cables, device net cables, PROFIBUS cables, etc.) sometimes can be used in common in accordance with the usage environment. In such a case, by changing from option cables CA2 to basic cables CA1, when the application of use changes, the number of cables to be replaced can be minimized. Below, the case where the option cables CA21 and CA22 which are arranged at the third position P3 of FIG. 7 are fastened as replacement cables CA3 (CA31, CA32) to the first fastening part FP1 will be explained.

Figure 8:
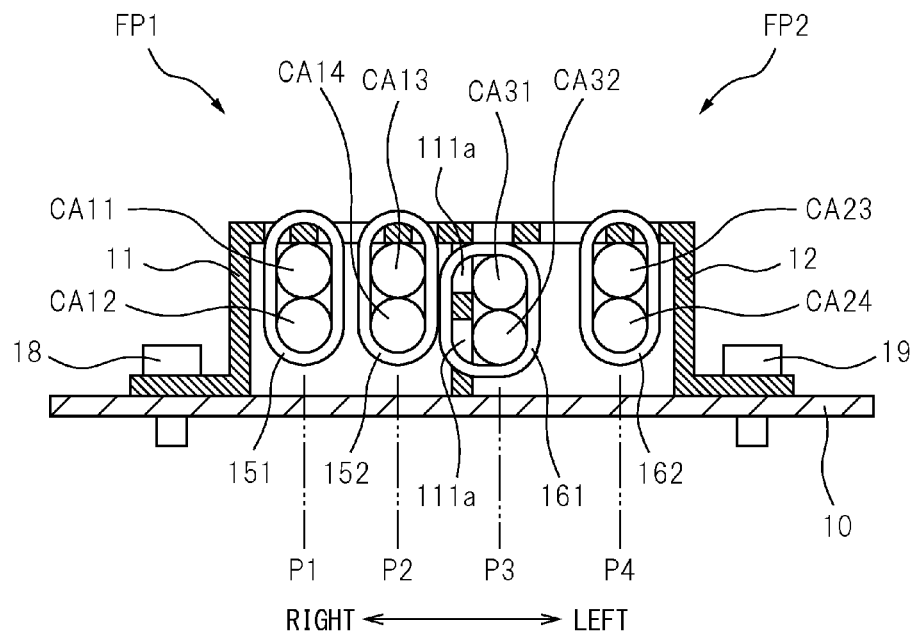
FIG. 8 is a view which shows an example of a change of a fastening pattern of umbilical members by the first umbilical member attachment device of the first specific example.

FIG. 8 is a view which shows an example of change of the fastening pattern of the replacement cables CA23 by the first umbilical member attachment device 1A. Note that the fastening patterns of the cables CA11, CA12, CA13, CA14, CA23, and CA24 are the same as in FIG. 7. While not shown, in the second umbilical member attachment device 1B as well, the fastening pattern of the replacement cables CA3 is changed in the same way as in FIG. 8.

As shown in FIG. 8, the fastening band 161 is inserted through the pair of top and bottom through holes 111a at the right side vertical plate part 111 of the first bracket 11 and surrounds the replacement cables CA31 and CA32. The fastening band 161 imparts a fastening force to the replacement cables CA31 and CA32 and fastens these at the third position P3 to the outside surface of the first bracket 11 at the inside space of the second bracket 12 adjoining each other at the top and bottom. Due to this, the replacement cables CA31 and CA32 can be configured as basic cables CA1.

In this state, if replacing the option cables CA23 and CA24, the second bracket 12 is detached from the base plate 10. At this time, the replacement cables CA31 and CA32 remain attached as basic cables CA1 to the third position P3. It is possible to detach only the option cables CA23 and CA24 from the robot 100 together with the second bracket 12.

As shown in FIG. 7, it is also possible to fasten the option cables CA21 and CA22 to the second bracket 12 and in that state replace the basic cables CA13 and CA14 with option cables CA2 as replacement cables CA31 and CA32. In this case, the left and right mounting positions of the first bracket 11 and the second bracket 12 are switched, then the option cables CA21, CA22, CA23, and CA24 are fastened on the top surface of the first bracket 11 and the replacement cables CA31 and CA32 (basic cables CA13 and CA14) are fastened at the right side surface of the first bracket 11. Further, the basic cables CA11 and CA12 are fastened on the top surface of the second bracket 12. Due to this, it is possible to leave the basic cables CA11 and CA12 attached to the robot 100 and detach the option cables CA21, CA22, CA23, and CA24 and the replacement cables CA31 and CA32 together from the robot 100.

According to the umbilical member attachment devices 1A and 1B of the first specific example, the following such actions and effects can be exhibited.

(1) The umbilical member attachment devices 1A and 1B have base parts FP0 attached detachably to the first member M1 and second member M2 of the robot 100, first fastening parts FP1 attached to the base parts FP0 to fasten the basic cables CA1, and second fastening parts FP2 attached to the base parts FP0 to fasten the option cables CA2, and provide the second fastening parts FP2 detachably from the base parts FP0 in the state with the basic cables CA1 fastened by the first fastening parts FP1. Due to this, the basic cables CA1 can be left attached to the robot 100 while detaching only the option cables CA2. Therefore, it is possible to easily replace the option cables CA2 along with changes in the application of use of the robot 100. Further, if detaching the base parts FP0 from the robot 100, it is possible to detach the cables as a whole, so detachment of the cables as a whole is easy.

(2) The first fastening parts FP1 have first brackets 11 and 21 which are detachably attached to the base plates 10 and 20 and fastening bands 15 and 25 which fasten the basic cables CA1 to the first brackets 11 and 21, while the second fastening parts FP2 have second brackets 12 and 22 which are detachably attached to the base plates 10 and 20 and fastening bands 16 and 26 which fasten the option cables CA2 to the second brackets 12 and 22. Further, in the state with the first brackets 11 and 21 attached to the base plates 10 and 20, the second brackets 12 and 22 are detachably attached to the base plates 10 and 20 together with the option cables CA2, while in the state with the second brackets 12 and 22 attached to the base plates 10 and 20, the first brackets 11 and 21 are detachably attached to the base plates 10 and 20 together with the basic cables CA1.

Due to this, by attaching and detaching the second brackets 12 and 22, it is possible to leave the fastening bands 16 and 26 fastening the plurality of option cables CA2 at the second brackets 12 and 22, and easily detach these option cables CA2 from the robot 100. Further, by attaching and detaching the first brackets 11 and 21, it is possible to leave the fastening bands 15 and 25 fastening the plurality of basic cables CA1 at the first brackets 11 and 21, and easily detach these basic cables CA1 from the robot 100. Therefore, it is possible to easily attach the plurality of basic cables CA1 and option cables CA2 at the original positions of the robot 100 (first position P1 to fourth position P4).

(3) The first brackets 11 and 21 and the second brackets 12 and 22 are arranged adjoining each other in a direction vertical to the longitudinal direction of the umbilical members CA (left-right direction), so the basic cables CA1 and option cables CA2 can be arranged aligned and the space for installation of the umbilical members CA can be reduced.

(4) Third fastening parts FP3 are provided at the front of the first bracket 11 and second bracket 12, at the back of the first bracket 21 and second bracket 22, and near the brackets 11, 12, 21, and 22, and these third fastening parts FP3 are used to fasten both the basic cables CA1 and option cables CA2 to the base parts FP0. Due to this, it is possible to firmly fasten the umbilical members CA to the base parts FP0, so smooth movement of the umbilical members CA at the moving parts MP becomes possible at the time of operation of the robot 100. Further, the umbilical members CA are positioned by the first fastening parts FP1 and the second fastening parts FP2, so the work of fastening the umbilical members at the third fastening parts FP3 becomes easy.

(5) The umbilical members CA include replacement cables CA3 which are fastened to one of the first fastening parts FP1 and second fastening parts FP2. The replacement cables CA3 can be fastened as part of the basic cables CA1 by the first fastening parts FP1 at predetermined positions (third positions P3) and, on the other hand, can be fastened as part of the option cables CA2 by the second fastening parts FP2 at the same predetermined positions (third positions P3). Due to this, even if the fastening pattern of the replacement cables CA3 is changed, since the replacement cables CA3 are arranged at the same position (third position P3), the umbilical member attachment devices 1A and 1B can be made small in size.

That is, for example, if considering the case of mounting of replacement cables CA3 causing the number of basic cables CA1 to increase from four to six and providing the top surfaces of the first brackets 11 and 21 with mounting portions corresponding to the six basic cables CA1, the first brackets 11 and 21 increase in size by that amount and the umbilical member attachment devices also increase in size. As opposed to this, in the present embodiment, if the number of the basic cables CA1 increases, the number of the option cables CA2 is deemed to decrease by that amount so the installation space of the option cables CA2 and the installation space of the basic cables CA1 can be put to dual use. For this reason, the cables CA1 and CA2 can be arranged efficiently without enlarging the umbilical member attachment devices 1A and 1B.

(6) The pipe member 119 (pipe part) is arranged along the axial line L1 of the center of rotation of the swivel 102 with respect to the base 101 and the umbilical members CA are run through the inside of the pipe member 119, so the umbilical members CA can be easily laid.

Second Specific Example

Next, specific examples of the umbilical member attachment devices 1C and 1D which are provided at the fastening parts 113 and 114 of FIG. 1B will be explained. The umbilical member attachment devices 1C and 1D are applied to a moving part 122 between the swivel 102 and bottom arm 103 of the robot 100. That is, the first member M1 corresponds to the swivel 102, while the second member M2 corresponds to the bottom arm 103.

Figure 9A:
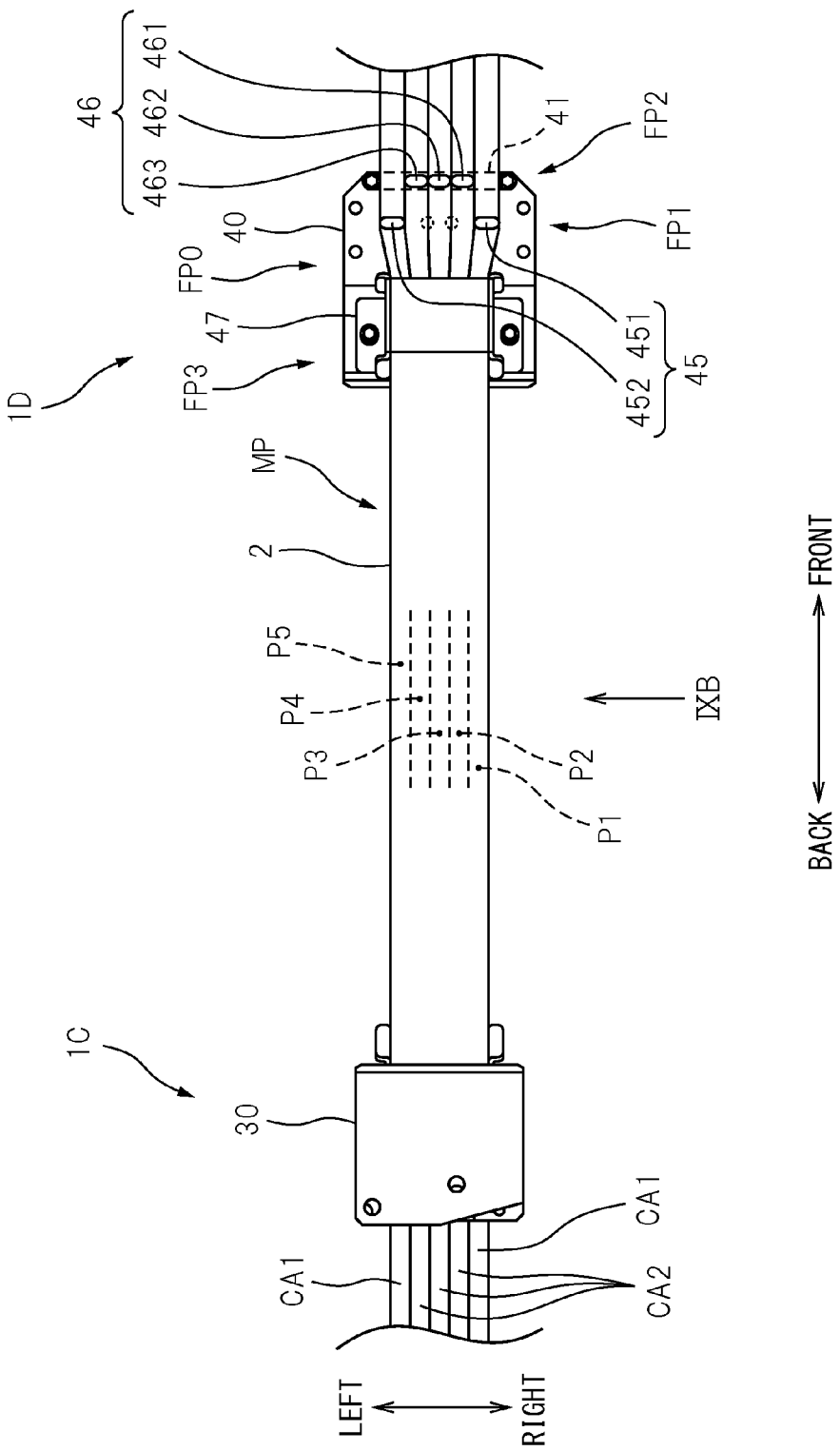
FIG. 9A is a plan view which shows the configuration of the umbilical member attachment devices of a second specific example of the present invention.

FIG. 9A is a plan view which shows the configurations of umbilical member attachment devices 1C and 1D of a second specific example, FIG. 9B is a side view (view along arrow IXB of FIG. 9A), and FIG. 9C is a back view (view along arrow IXC of FIG. 9B). Below, in the same way as the first specific example, as shown in FIG. 9A to FIG. 9C, a front-back direction (length direction), left-right direction (width direction), and top-bottom direction (height direction) are defined. The configurations of the parts will be explained in accordance with this definition.

In the second specific example, the umbilical members CA are laid in five lines in the left-right direction and two layers in the top-bottom direction. The umbilical members CA are therefore comprised of a total of ten cables (basic cables CA1 and option cables CA2). In FIG. 9A, if defining the positions of the umbilical members CA of the five lines in the left-right direction as the first position P1 to the fifth position P5, two each of the basic cables CA1 are arranged at each of the first position P1 and fifth position P5, while two each of the option cables CA2 are arranged at each of the second position P2, third position P3, and fourth position P4 (see FIG. 12).

As shown in FIG. 9A to FIG. 9C, the base part FP0 of the first umbilical member attachment device 1C has a base bracket 30. The first fastening part FP1 of the first umbilical member attachment device 1C has fastening bands 35 (351, 352). The second fastening part FP2 of the first umbilical member attachment device 1C has a support plate 31 and fastening bands 36 (361, 362, 363). The third fastening part FP3 of the first umbilical member attachment device 1C has a fastening cover 37.

In the same way as the first umbilical member attachment device 1C, the base part FP0 of the second umbilical member attachment device 1D has a base bracket 40. The first fastening part FP1 of the second umbilical member attachment device 1D has fastening bands 45 (451, 452). The second fastening part FP2 of the second umbilical member attachment device 1D has a support plate 41 and fastening bands 46 (461, 462, 463). The third fastening part FP3 of the second umbilical member attachment device 1D has a fastening cover 47. Between the fastening covers 37 and 47 of the first umbilical member attachment device 1C and the second umbilical member attachment device 1D, a cable cover 2 is provided so as to cover the moving parts MP of the umbilical members CA as a whole.

Figure 10:
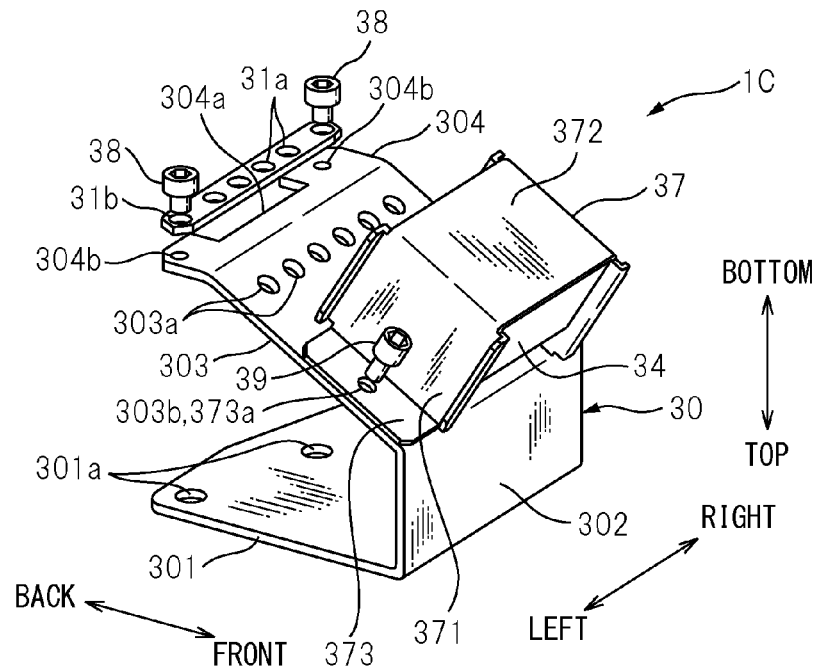
FIG. 10 is a disassembled perspective view of a first umbilical member attachment device of FIG. 9A.
Figure 11:
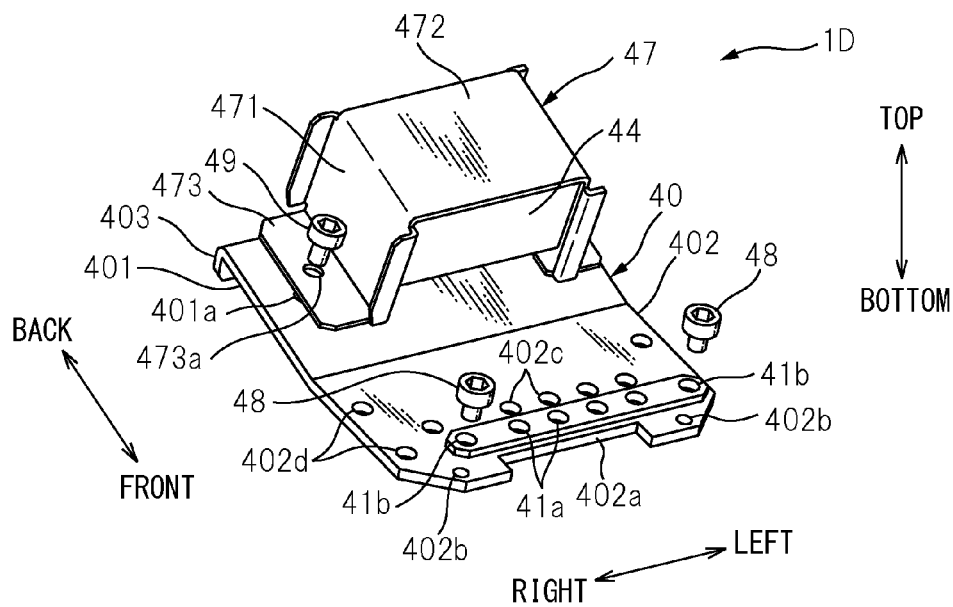
FIG. 11 is a disassembled perspective view of a second umbilical member attachment device of FIG. 9A.

FIG. 10 is a disassembled perspective view of the first umbilical member attachment device 1C, while FIG. 11 is a disassembled perspective view of the second umbilical member attachment device 1D. In FIG. 10 and FIG. 11, illustration of the fastening bands 35, 36, 45, and 46 is omitted.

As shown in FIG. 10, the base bracket 30 of the first umbilical member attachment device 1C is formed by a flat plate of a constant width in the left-right direction which is bent into a substantially U-shape and has a first surface part 301 which extends in the front-back direction, a second surface part 302 which extends from the front end of the first surface part 301 downward, a third surface part 303 which extends from the bottom end of the second surface part 302 to the back and inclined downward, and a fourth surface part 304 which extends from the bottom end of the third surface part 303 in parallel with the first surface part 301 to the back. The bottom surface of the first surface part 301 forms the mounting surface which is attached to the first member M1, while the bottom surface of the third surface part 303 and the bottom surface of the fourth surface part 304 forms a carrying surface on which the umbilical members CA are carried.

The first surface part 301 is formed with through holes 301a for attaching the base bracket 30 to the first member M1. At the back end of the third surface part 303, a plurality of (six) through holes 303a through which the fastening bands 35 are inserted are formed in the left-right direction at equal intervals. In front of the through holes 303a, screw holes 303b for attaching the fastening cover 37 are provided at the two left and right ends. At the back end face of the fourth surface part 304, a rectangular cutaway part 304a is formed. At the two left and right sides of, the cutaway part 304a, screw holes 304b are provided for attaching the support plate 31.

The support plate 31 is a substantially rectangular shaped flat plate which is long in the left-right direction. At the two left and right ends of the support plate 31, a pair of through holes 31b through which the bolts 38 pass are formed. At the left and right insides of through holes, 31b, a plurality of (four) through holes 31a through which the fastening bands 36 pass are formed in the left-right direction at equal intervals. The support plate 31 is attached to the base bracket 30 by screwing the bolts 38 which are passed through the through holes 31b into the screw holes 304b. In the state where the support plate 31 is attached, all of the through holes 31a are positioned at the inside of the cutaway part 304a.

The fastening cover 37 is formed from a flat plate which is bent into a cross-sectional U-shape and has a left and right pair of vertical plate parts 371, a horizontal plate part 372 which connects ends of the vertical plate parts 371 with each other, and flange parts 373 which extend from the other ends of the vertical plate parts 371 outside in the left-right direction. At the inside of the fastening cover 37, a shrinkable elastic member 34 which has elasticity is fit. Due to the elastic member 34, the umbilical members CA can be pushed to the base bracket 30 side. As the elastic member 34, for example, a sponge can be used. At the flange parts 373, through holes 373a are formed. The fastening cover 37 is attached to the base bracket 30 by screwing the bolts 39 which are passed through the through holes 373a into the screw holes 303b.

As shown in FIG. 11, the base bracket 40 of the second umbilical member attachment device 1D is formed by a flat plate of a constant width in the left-right direction which is bent and has a first surface part 401 which extends in the front-back direction, a second surface part 402 which extends from the front end of the first surface part 401 inclined upward, and a third surface part 403 which extends from the bottom end of the first surface part 401 downward. The top surface of the first surface part 401 and the top surface of the second surface part 402 form the carrying surface on which the umbilical members CA are carried, while the bottom surface of the second surface part 402 forms the mounting surface which is attached to the second member M2.

The first surface part 401 is formed with screw holes 401a for attaching the fastening cover 47 at the two left and right sides. At the front end face of the second surface part 402, a rectangular shaped cutaway part 402a is formed. At the two left and right sides of the cutaway part 402a, screw holes 402b are provided for attaching the support plate 41. At the back of the cutaway part 402a, a plurality of (six) through holes 402c through which the fastening bands 45 are inserted are formed in the left-right direction at equal intervals. At the two left and right sides of the through holes 402c, through holes 402d are provided for attaching the base bracket 40 to the second member M2.

The support plate 41 is formed with a part of through holes 41b through which the bolts 48 are inserted. At the left and right insides of the through holes 41b, a plurality of (four) through holes 41a through which the fastening bands 46 pass are formed in the left-right direction at equal intervals. The support plate 41 is attached to the base bracket 40 by screwing the bolts 48 which are inserted through the through holes 41b into the screw holes 402b. In the state where the support plate 41 is attached, all of the through holes 41a are positioned at the inside of the cutaway part 402a.

The fastening cover 47 has a left and right pair of vertical plate part 471, a horizontal plate part 472 which connects ends of the vertical plate parts 471 with each other, and flange parts 473 which extend from the other ends of the vertical plate parts 471 to the outsides in the left-right direction. At the inside of the fastening cover 47, a shrinkable elastic member 44 which has elasticity is fit. Due to the elastic member 44, the umbilical members CA can be pushed to the base bracket 40 side. At the flange parts 373, through holes 473a are formed. The fastening cover 47 is attached to the base bracket 40 by screwing the bolts 49 which are passed through the through holes 473a into the screw holes 401b.

The base bracket 30 of the first umbilical member attachment device 1C and the base bracket 40 of the second umbilical member attachment device 1D are configured according to the shapes of the members to be attached, that is, the first member M1 and second member M2, and these shapes are different from each other. As opposed to this, the support plate 31 and fastening cover 37 of the first umbilical member attachment device 1C are configured equally to the support plate 41 and fastening cover 47 of the second umbilical member attachment device 1D. Further, the fastening bands 35 and 36 of the first umbilical member attachment device 1C and the fastening bands 45 and 46 of the second umbilical member attachment device 1D are configured equally. Due to this, it is possible to use common parts and possible to reduce the number of parts.

Figure 12:
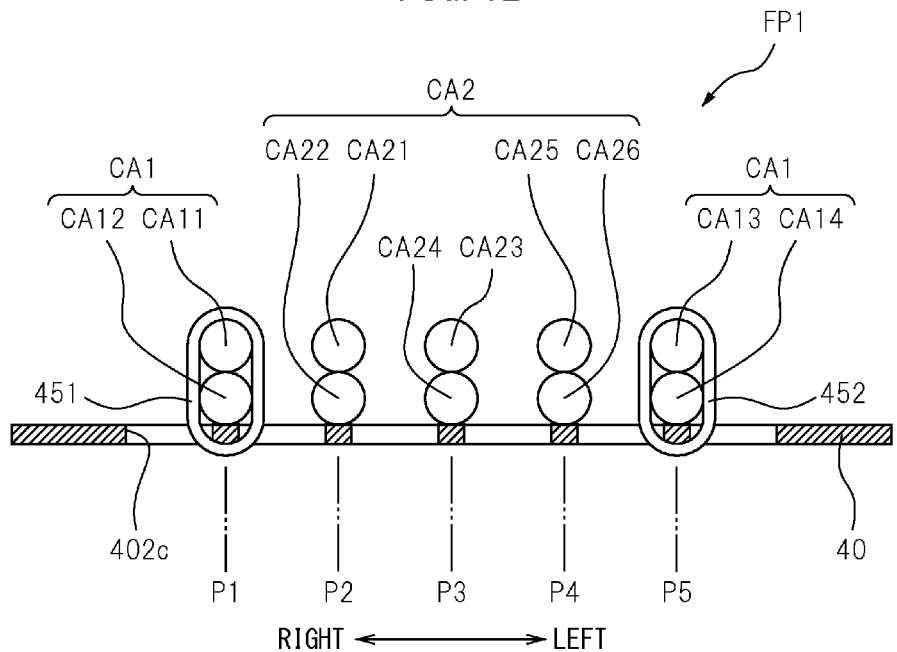
FIG. 12 is a cross-sectional view along the line XII-XII of FIG. 9C.
Figure 13:
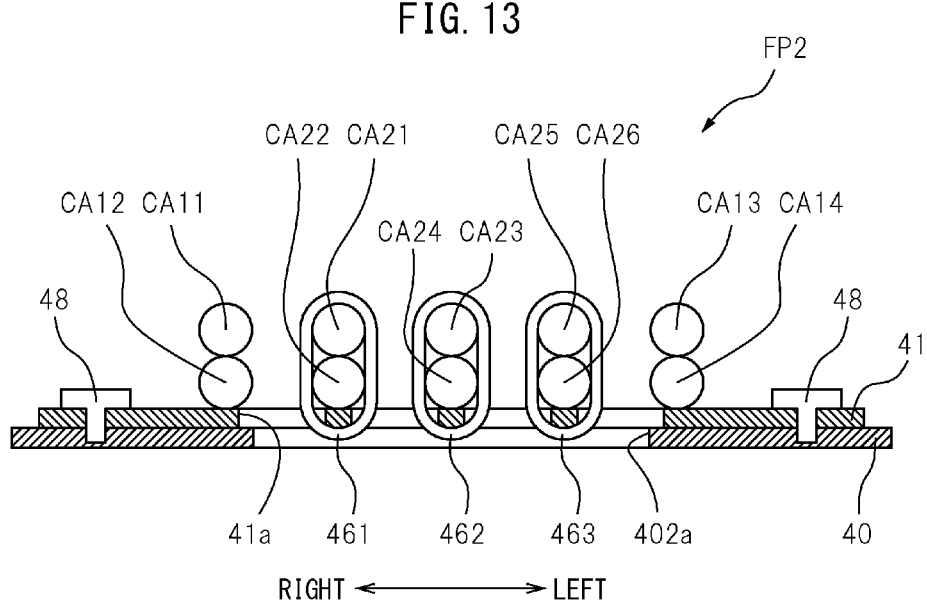
FIG. 13 is a cross-sectional view along the line XIII-XIII of FIG. 9C.

FIG. 12 is a cross-sectional view along the line XII-XII of FIG. 9C which shows the fastened state of umbilical members CA by the first fastening part FP1 of the second umbilical member attachment device 1D, while FIG. 13 is a cross-sectional view along the line XIII-XIII of FIG. 9C which shows the fastened state of umbilical members CA by the second fastening part FP2 of the second umbilical member attachment device 1D. In the first umbilical member attachment device 1C as well, the umbilical members CA are fastened in the same way as FIG. 12 and FIG. 13, so illustration of this point will be omitted.

As shown in FIG. 12, the fastening band 451 is inserted through the through holes 402c at the two locations at the right side of the base bracket 40 and surrounds the basic cables CA11 and CA12. The fastening band 452 is inserted through the through holes 402c at the two locations at the left side of the base bracket 40 and surrounds the basic cables CA13 and CA14. The fastening bands 451 and 452 impart fastening forces to the basic cables CA1 (CA11, CA12, CA13, and CA14). Due to this, the basic cables CA1 are fastened at the first position P1 and fifth position P5 on the base bracket.

As shown in FIG. 13, the fastening band 461 is inserted through the through holes 41a at the two locations at the right side of the support plate 41 and surrounds the option cables CA21 and CA22. The fastening band 462 is inserted through the through holes 41a at the two locations at the left-right center of the support plate 41 and surrounds the option cables CA23 and CA24. The fastening band 463 is inserted through the through holes 41a at the two locations at the left side of the support plate 41 and surrounds the option cables CA25 and CA26. The fastening bands 461 to 463 impart fastening forces to the option cables CA2 (CA21, CA22, CA23, CA24, CA25, and CA26). Due to this, the option cables CA2 are fastened at the second position P2, third position P3, and fourth position P4 on the base bracket.

In the state where the option cables CA2 are fastened, the bottom ends of the fastening bands 461 to 463 are arranged inside of the cutaway part 402a of the base bracket 40. For this reason, the fastening bands 461 to 463 and the base bracket 40 do not interfere with each other.

Figure 14A:
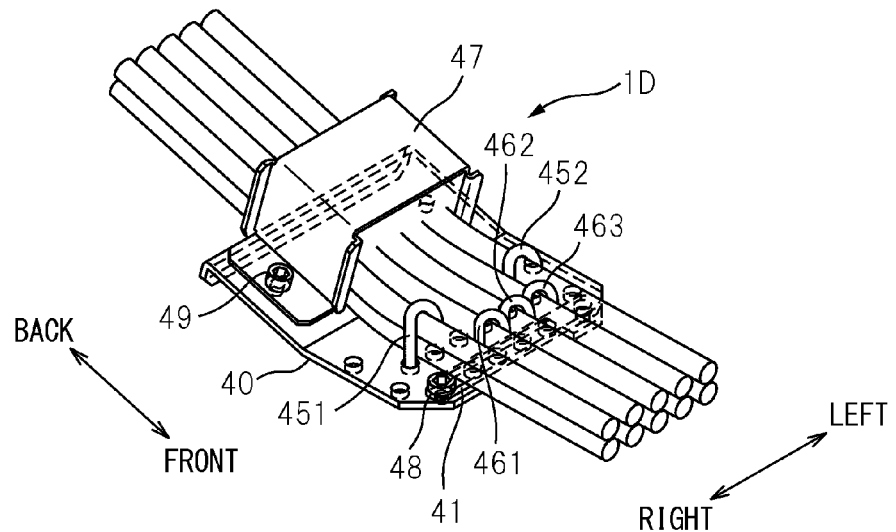
FIG. 14A is a perspective view which shows an example of use of the umbilical member attachment device of the second specific example of the present invention.
Figure 14B:
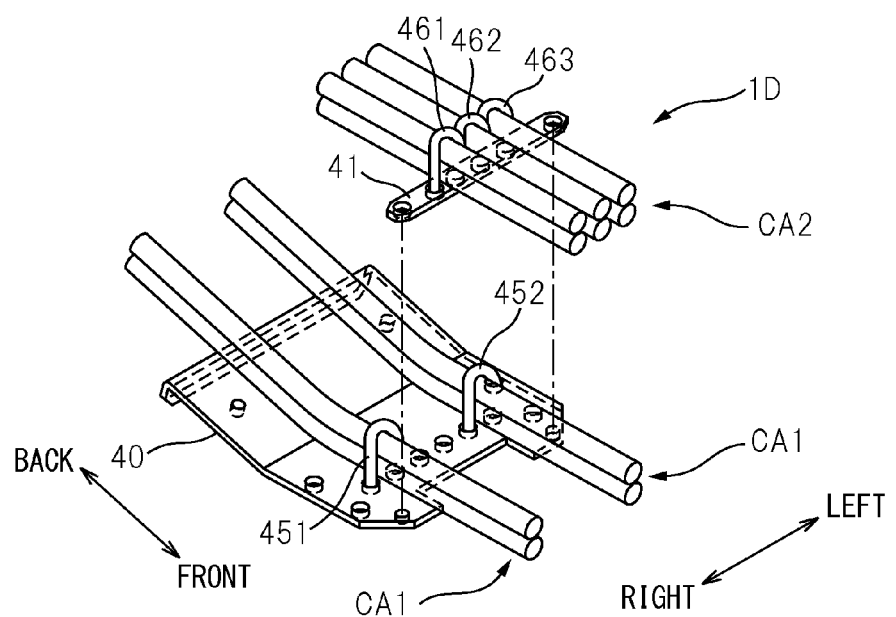
FIG. 14B is a perspective view which shows an example of use of the umbilical member attachment device of the second specific example of the present invention.

The procedure when using the umbilical member attachment devices 1C and 1D of the second specific example to attach and detach umbilical members CA to and from the robot 100 (first member M1 and second member M2) will be explained. FIG. 14A and FIG. 14B are perspective views which show an example of use of the second umbilical member attachment device 1D. Illustration of the example of use of the first umbilical member attachment device 1C will be omitted. First, not shown bolts are used to attach the base brackets 30 and 40 to the first member M1 (swivel 102) and second member M2 (bottom arm 103). Next, the basic cables CA1 are fastened by the fastening bands 35 and 45 to the base brackets 30 and 40 (see FIG. 14B). Further, the option cables CA2 are fastened to the support plates 31 and 41 by the fastening bands 36 and 46. At this time, the basic cables CA1 and option cables CA2 are marked in advance at the fastening positions by the fastening bands 35 and 45 and fastening bands 36 and 46. The marking positions and fastening positions are aligned.

Next, while spreading apart the basic cables CA1, the support plates 31 and 41 are inserted at the left and right insides of the basic cables CA1 and below the basic cables CA1, then the support plates 31 and 41 are fastened by the bolts 38 and 48 to the base brackets 30 and 40 (see FIG. 14A). Due to this, the basic cables CA1 are positioned and fastened by the first fastening part FP1 to the first position P1 and fifth position P5 (FIG. 12), while the option cables CA2 are fastened by the second fastening part FP2 to the second position P2, third position P3, and fourth position P4 (FIG. 13).

Finally, the fastening covers 37 and 47 are fastened to the base brackets 30 and 40 by the bolts 39 and 49 (see FIG. 14A). Due to this, the basic cables CA1 and the option cables CA2 as a whole are fastened by the fastening covers 37 and 47. In this case, the cables 1A and 1B are positioned and fastened by the first fastening part FP1 and the second fastening part FP2 on the base brackets, so attachment of the fastening covers 37 and 47 is easy.

Inside of the fastening covers 37 and 47, elastic members 34 and 44 are fit. Due to the elastic members 34 and 44, a fastening force acts on the umbilical members CA. The areas of the portions on which this fastening force acts are large, so the fastening covers 37 and 47 can be strongly fastened to the umbilical members CA at the two sides of the moving parts MP. With the above, the umbilical members CA finish being attached. In the state with the umbilical members finished being attached, as shown in FIG. 9A, the cable cover 2 is provided at the moving parts MP of the umbilical members CA. Due to this, the umbilical members CA can be protected from spatter and other matter flying in from the outside.

When detaching the option cables CA2 (existing cables) from the robot 100 and attaching other option cables CA2 (replacement cables), first, the bolts 39 and 49 are loosened and the fastening covers 37 and 47 are taken off from the base brackets 30 and 40. Next, the bolts 38 and 48 are loosened, and the support plates 31 and 41 are detached from the base brackets 30 and 40 together with the existing cables CA2. Furthermore, the fastening bands 36 and 46 are detached once to detach the existing cables CA2 from the support plates 31 and 32, then the fastening bands 36 and 46 are used to fasten the replacement cables CA2 to the support plates 31 and 41.

Finally, the support plates 31 and 41 are fastened to the base brackets 30 and 40, then the cables as a whole are fastened by the fastening covers 37 and 47 to the base brackets 30 and 40. Due to this, when attaching and detaching the option cables CA2, the basic cables CA1 do not have to be detached from the robot 100, so replacement of the option cables CA2 etc. is easy. When attaching the option cables CA2 to the robot 100, just the basic cables CA1 can be attached and detached. In this case, it is sufficient to leave the support plates 31 and 41 attached to the base brackets 30 and 40 and just attach and detach the fastening bands 35 and 45 to and from the base brackets 30 and 40.

When detaching both the basic cables CA1 and option cables CA2 from the robot 100, the bolts for fastening the base plate are loosened, then the cables as a whole are detached from the first member M1 and second member M2 together with the base plate brackets 30 and 40. Therefore, it is possible to easily detach the cables as a whole without detaching the fastening bands 35, 36, 45, and 46 and the fastening covers 37 and 47. After that, when again attaching the cables as a whole to the robot 100, it is sufficient to attach the base brackets 35, 36, 45 and 46 to the first member M1 and second member M2. Attachment of the cables as a whole also becomes easy.

When replacing part of the option cables CA2 (for example, CA21 and CA22 of FIG. 12) as the replacement cables CA3 (CA31 and CA32) with the basic cables CA1, the following procedure is followed: FIG. 15, FIG. 16, FIG. 17A, and FIG. 17B are views which show examples of replacement of option cables CA21 and CA22 with basic cables CA1 and correspond respectively to FIG. 12, FIG. 13, FIG. 14A, and FIG. 14B.

Figure 15:
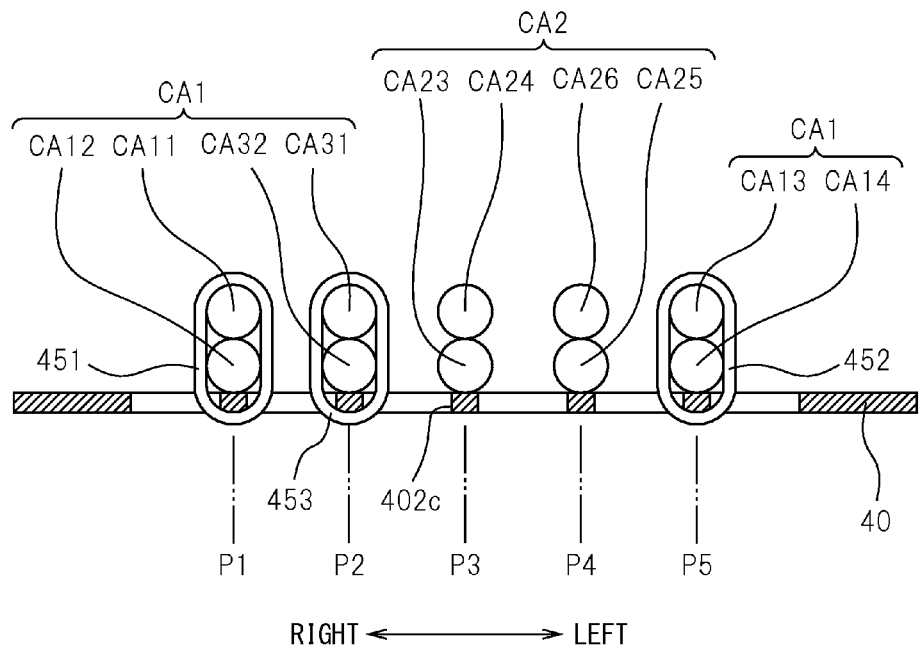
FIG. 15 is a view which shows a fastening pattern of umbilical members in a different mode from FIG. 12.
Figure 16:
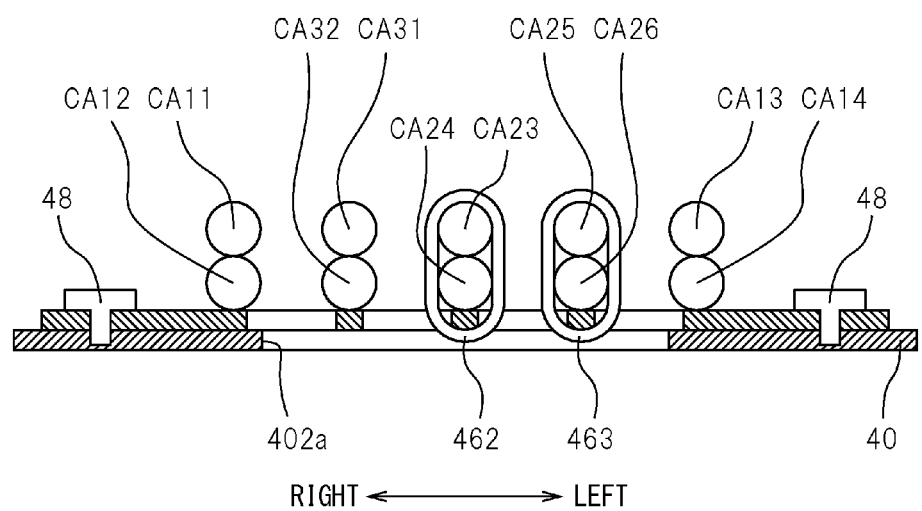
FIG. 16 is a view which shows a fastening pattern of umbilical members in a different mode from FIG. 13.
Figure 17A:
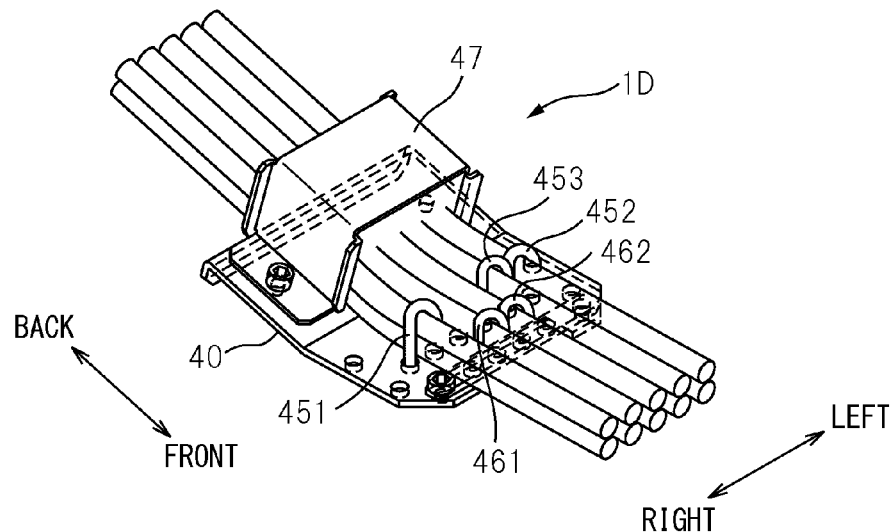
FIG. 17A is a view which shows a fastening pattern of umbilical members in a different mode from FIG. 14A.

As shown in FIG. 15, the replacement cables CA31 and CA32 are fastened by the fastening bands 35 and 45 (453) at the second position P2 of the base bracket. Therefore, as shown in FIG. 16 and FIG. 17A, at the support plates 31 and 41, only the option cables CA23, CA24, CA25 and CA26 are fastened by the fastening bands 36 and 46.

Figure 17B:
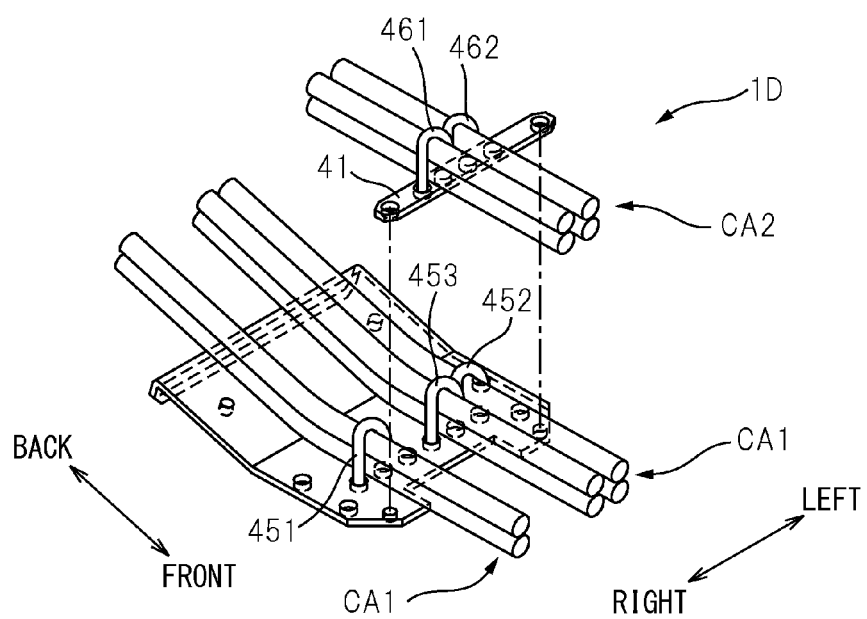
FIG. 17B is a view which shows a fastening pattern of umbilical members in a different mode from FIG. 14B.

In this state, when replacing the option cables CA23, CA24, CA25 and CA26, as shown in FIG. 17B, the support plates 31 and 41 are detached from the base brackets 30 and 40. At this time, the replacement cables CA31 and CA32 remain attached as basic cables CA1 to the third position P3, while only the option cables CA23, CA24, CA25 and CA26 are detached from the robot 100 integrally with the support plates 31 and 41. If forming the support plates 31 and 41 in a greater number (for example, same number as through holes 303a and 402c of the base brackets 30 and 40) of through holes 31a and 41a, it is possible to replace part of the basic cables CA1 as the replacement cables CA3 with the option cables CA2.

Third Specific Example

Next, specific examples of the umbilical member attachment device 1E and 1F which are provided at the fastening parts 115 and 116 of FIG. 1B will be explained. The umbilical member attachment devices 1E and 1F are applied to the moving part 123 between the bottom arm 103 and the top arm 104 of the robot 100. That is, the first member M1 corresponds to the bottom arm 103, while the second member M2 corresponds to the top arm 104.

Figure 18B:
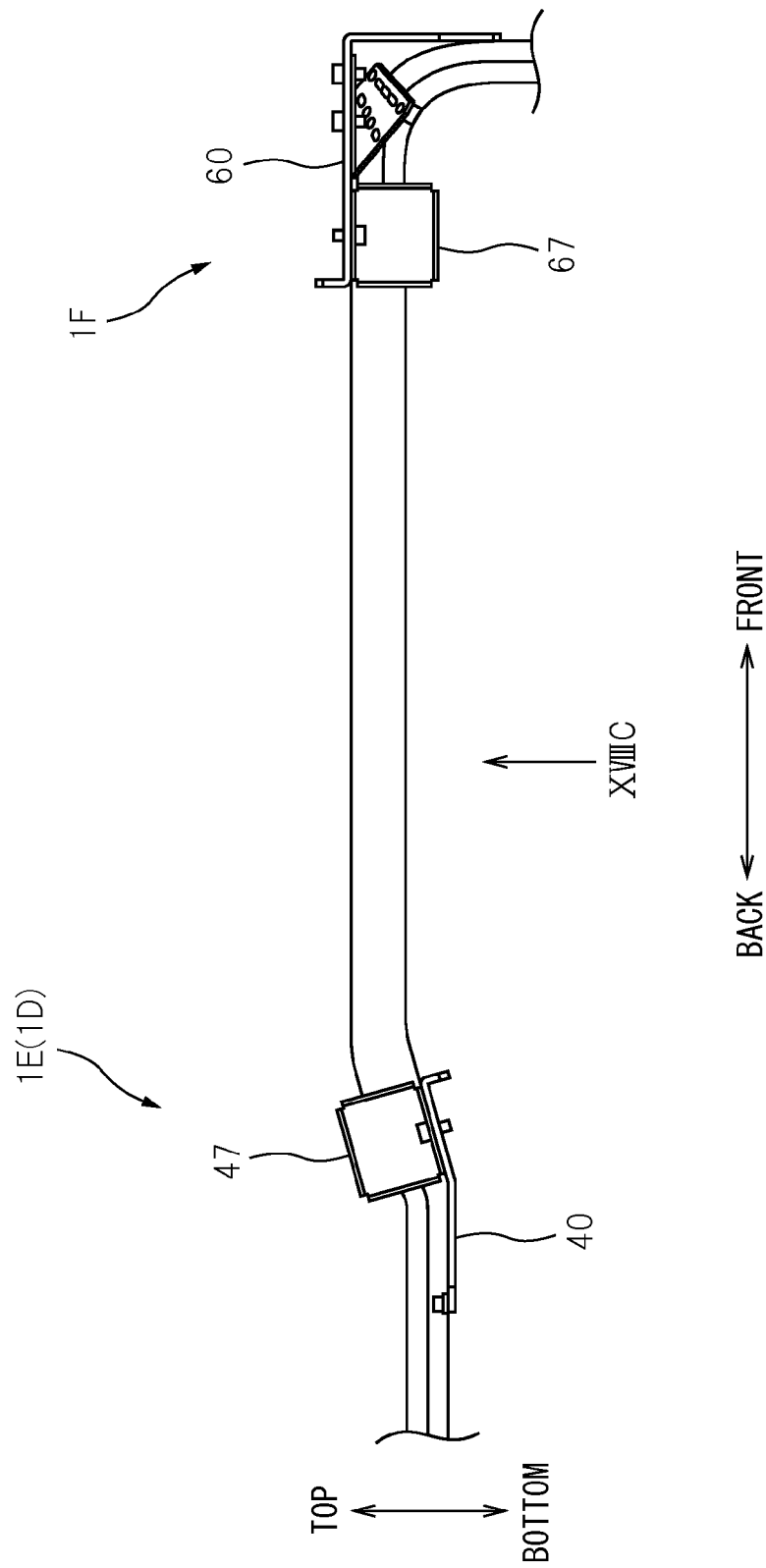
FIG. 18B is a side view which shows the configuration of the umbilical member attachment devices of the third specific example of the present invention.
Figure 18C:
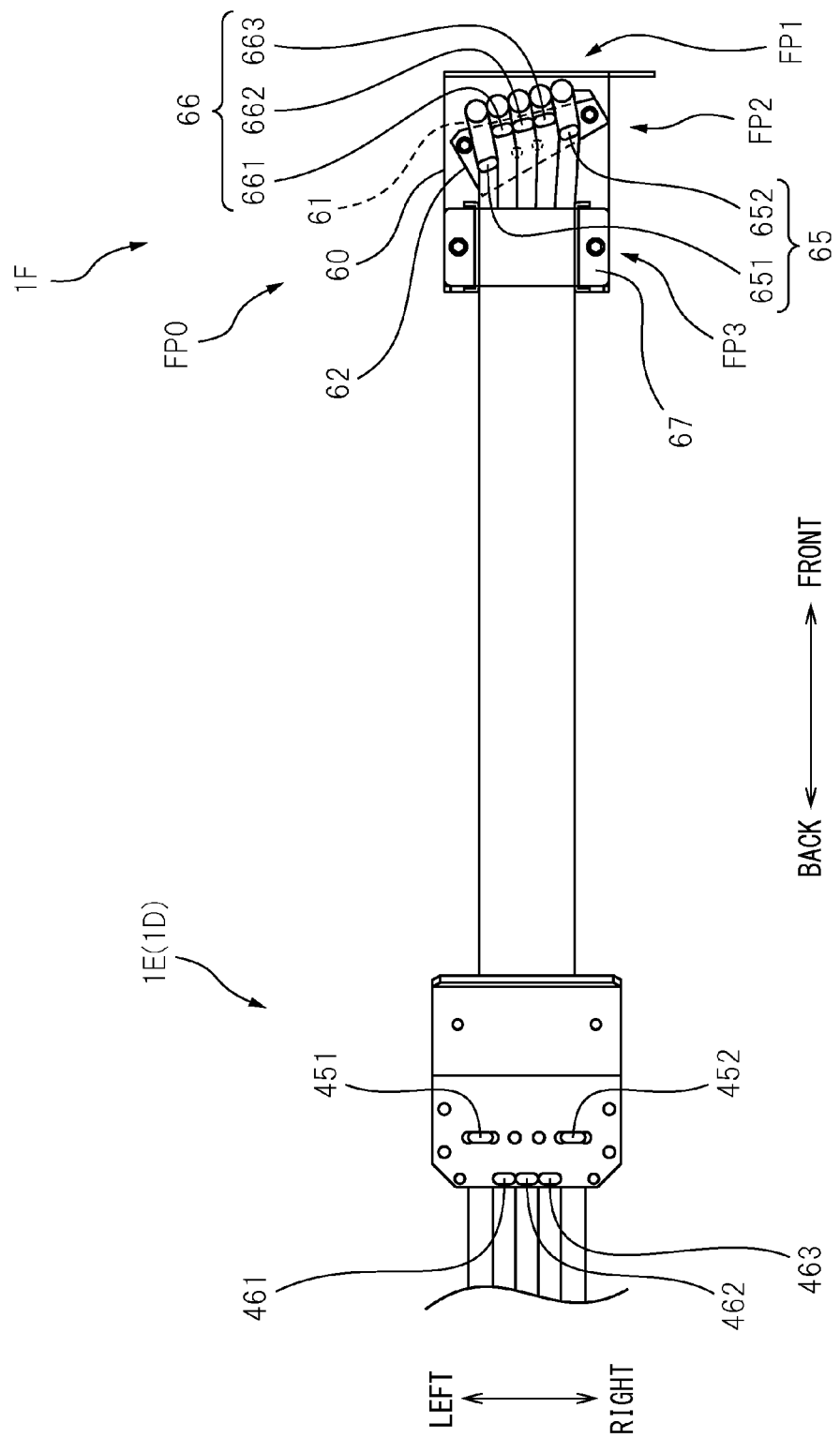
FIG. 18C is a back view which shows the configuration of the umbilical member attachment devices of the third specific example of the present invention.

FIG. 18A is a plan view which shows the configurations of the umbilical member attachment devices 1E and 1F of the third specific example, FIG. 18B is a side view (view along the arrow XVIIIB of FIG. 18A), and FIG. 18C is a back view (view along the arrow XVIIIC of FIG. 18B). Below, in the same way as the second specific example, as shown in FIG. 18A to FIG. 18C, a front-back direction (length direction), left-right direction (width direction), and top-bottom direction (height direction) are defined and the configuration of the parts are explained in accordance with the definitions. The configuration of the first umbilical member attachment device 1E in the third specific example is the same as the configuration of the second umbilical member attachment device 1D of the second specific example (FIG. 11). Therefore, below, the configuration of the second umbilical member attachment device 1F will be explained.

As shown in FIG. 18A to FIG. 18C, the base part FP0 of the second umbilical member attachment device 1F has a base bracket 60. The first fastening part FP1 of the second umbilical member attachment device 1F has an inclined bracket 62 and fastening bands 65 (651, 652). The second fastening part FP2 of the second umbilical member attachment device 1F has a support plate 61 and fastening bands 66 (661, 662, 663). The third fastening part FP3 of the second umbilical member attachment device 1F has a fastening cover 67.

FIG. 19 is a disassembled perspective view of the second umbilical member attachment device 1F. In FIG. 19, illustration of the fastening bands 65 and 66 is omitted. As shown in FIG. 19, the base bracket 60 is formed from a flat plate which is bent in an L-shape, and has a first surface part 601 which extends in the front-back direction, a second surface part 602 which extends from a front end of the first surface part 601 downward, and a third surface part 603 which extends from a back end of the first surface part 601 upward. A bottom surface of the back side of the first surface part 601 configures a carrying surface on which the umbilical members CA are carried, a front surface of the second surface part 602 configures an attachment surface which is attached to the second member M2, and a back surface of the second surface part 602 configures a guide surface which guides the umbilical members CA downward.

The first surface part 601 is formed with a left and right pair of through holes 601a for attachment of the inclined bracket 62 and is provided with a left and right pair of screw holes 601b for attachment of the fastening cover 67. The second surface part 602 is formed with through holes 602a for attaching the base bracket 60 to the second member M2. Among the left and right pair of through holes 601a, the left side through hole 601a is positioned behind from the right side through hole 601a.

The inclined bracket 62 is formed by a flat plate which is bent at a sharp angle, and has a substantially rectangular first surface part 621 which is attached to the first surface part 601 of the base bracket 60 and a second surface part 622 which extends from the back end of the first surface part 621 inclined to the front and downward. The second surface part 622 exhibits a trapezoidal shape with a parallel left end face and right end face, and has a length of the left end face longer than the length of the right end face. The first surface part 621 is provided with screw holes 621a corresponding to the through holes 601a of the base bracket 60. By screwing the bolts 70 which are passed through the through holes 601a into the screw holes 621a, the inclined bracket 62 is fastened to the base bracket 60.

The second surface part 622 is provided with a plurality of (six) through holes 622a, through which the fastening bands 65 are passed, in the left-right direction at equal intervals. The plurality of through holes 622a are arranged at positions gradually lower toward the left side. The front end face of the second surface part 622 is formed with a rectangular shaped cutaway part 622b. At the two left and right sides of the cutaway part 622b, screw holes 622c are provided for attaching the support plate 61. The support plate 61 is configured equivalently to the support plate 41 of the first umbilical member attachment device 1E (FIG. 11). The support plate 61 is provided with a plurality of (four) through holes 61a through which the fastening bands 66 are inserted and through holes 61b for attaching the support plate 61. By screwing the bolts 68 which pass through the through holes 61b into the screw holes 622c, the support plate 61 is fastened to the inclined bracket 62.

The fastening cover 67 is configured equivalently to the fastening cover 57 of the first umbilical member attachment device 1E (FIG. 11). Inside of the fastening cover 67, an elastic member 64 is attached. The fastening cover 67 is fastened to the base bracket 60 by screwing the bolts 69 which pass through the through holes 673a of the flange part 673 into the screw holes 601b.

The second umbilical member attachment device 1F differs from the first umbilical member attachment device 1E in the point of provision of the inclined bracket 62 for facilitating laying of the umbilical members CA. The basic configuration for fastening the umbilical members CA is the same as the first umbilical member attachment device 1E (second umbilical member attachment device 1D of second specific example). That is, the basic cables CA1 are fastened by the fastening bands 651 and 652 which pass through the through holes 622a of the inclined bracket 62 (FIG. 18C) to the inclined bracket 62. The option cables CA2 are fastened by the fastening bands 661, 662 and 663 which pass through the through holes 61a of the support plate 61 (FIG. 18C) to the inclined bracket 62 through the support plate 61. The cables as a whole are fastened to the base bracket 60 by the fastening cover 67.

If loosening the bolts 69 to detach the fastening cover 67 and loosening the bolts 68 to detach the support plate 61, it is possible to leave the basic cables CA1 attached to the robot 100 and detach only the option cables CA2. If loosening the bolts 69 to detach the fastening cover 67 and detaching the fastening bands 65, it is possible to leave the option cables CA2 attached to the robot 100 and detach only the basic cables CA1. If loosening the bolts to detach the base bracket 60 from the second member M2, it is possible to detach the cables as a whole from the robot 100 together with the base bracket 60. It is possible to replace part of the option cables CA2 as the replacement cables with the basic cables CA1 and possible to replace part of the basic cables CA1 as the replacement cable with the option cables CA2.

Figure 20A:
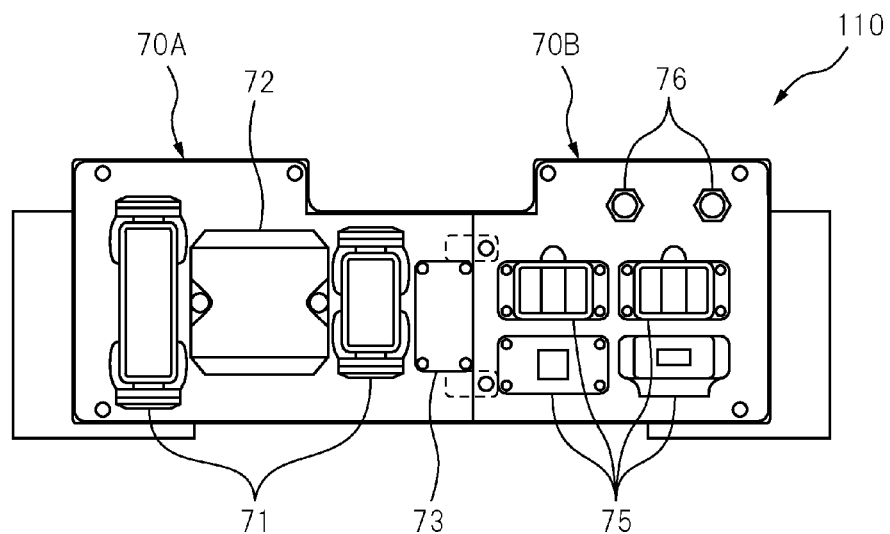
FIG. 20A is a front view of a distribution board which is applied to a robot according to an embodiment of the present invention.
Figure 20B:
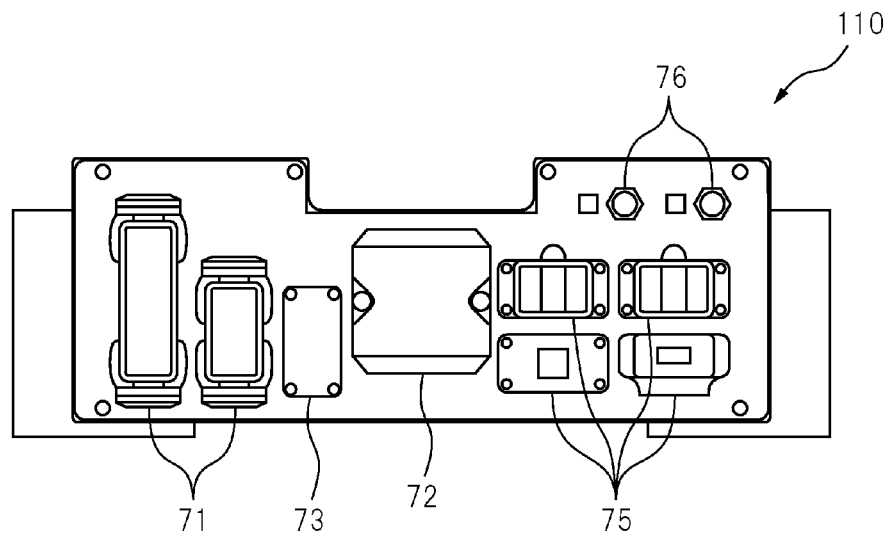
FIG. 20B is a view which shows a comparative example of FIG. 20A.

The robot 100 according to the present embodiment is characterized by the configuration of the distribution board 110 (FIG. 1D) as well. FIG. 20A is a front view which shows the configuration of the distribution board 110. As shown in FIG. 20A, the distribution board 110 is configured split into a first distribution board 70A and a second distribution board 70B. The first distribution board 70A is the distribution board for the basic cables, and has connectors 71 to which the basic cables CA1 are connected, a battery box 72, and a space 73 for attachment of a spare connector.

The space 73 for attachment of a spare connector is provided in preparation for the case of adding umbilical members CA as basic cables CA1. As umbilical members which are connected to the spare connector 73, for example, there are cables for driving fan motors for cooling servo motors. The battery box 72 (power supply) contains a battery and can supply power for maintaining positional information of the robot drive servo motors 106 to 108. That is, the battery box 72 functions as a backup power supply. On the other hand, the second distribution board 70B is a distribution board for the option cable use, and has a connector 75 to which the option cables CA2 are connected and a coupling 76 to which option tubes and pipes are connected.

According to such a configuration, when replacing the option cables CA2, it is sufficient to replace only the second distribution board 70B. The first distribution board 70A does not need to be replaced. For this reason, it is possible to maintain the positional information of the servo motors 106 to 108 as it is. As opposed to this, as shown by the comparative example of FIG. 20A, that is, FIG. 20B, in a configuration where the distribution board 110 is not split into a first distribution board and second distribution board, when replacing the option cables CA2, the distribution board 110 itself has to be replaced. For this reason, the battery box 72 is detached from the distribution board 110 and the positional information of the servo motors 106 to 108 ends up being lost.

Modifications

Above, as one example of the basic cables CA1, the power lines and signal lines to the servo motors 106 to 109 which drive the robot 100 are included. However, the configuration of the first umbilical members comprised of the basic cables CA1 is not limited to this. The configuration of the second umbilical members comprised of the options cable CA2 is also not limited to this. The numbers and arrays of the basic cables CA1 and the option cables CA2 are also not limited to those explained above. For example, one or both of the basic cables CA1 and option cables CA2 may also be single cables. The first umbilical members may also be treated as option cables CA2, and the second umbilical members as basic cables CA1. Although the base plates 10 and 20 and the base brackets 30, 40, and 60 are used as the base part FP0, the configuration of the base part FP0 may be any configuration so long as able to be attached to or detached from the first member M1 and second member M2.

In the above embodiment, although the first fastening part FP1, second fastening part FP2, and third fastening part FP3 are attached to the base part FP0, the attachment positions are not limited to the ones explained above. The third fastening part FP3 may also be omitted. "Attaching the first fastening part FP1 and the second fastening part FP2 to the base part FP0" includes all of the case of directly attaching the first fastening part FP1 and the second fastening part FP2 to the base part FP0, the case of attaching the second fastening part FP2 to the base part FP0 through the first fastening part FP1, the case of attaching the first fastening part FP1 to the base part FP0 through the second fastening part FP2, and the case of attaching another attachment member to the base part FP0 and attaching the first fastening part FP1 or the second fastening part FP2 to that attachment member. That is, so long as positioning the basic cables CA1 and option cables CA2 at the base part FP0, the first fastening part FP1 and second fastening part FP2 can be configured in any way.

In the above embodiments, although the base part FP0 is provided with various types of brackets 11, 12, 21, 22 and 62 and support plates 31, 41 and 61, the configuration of the attachment members, that is, the second attachment members, comprised of the brackets 12, 22 and 62 and the support plates 31, 41 and 61 and configuration of the first attachment members, comprised of the brackets 11, 21 and 62 are not limited in configuration. In the present embodiment, although the basic cables CA1 and the option cables CA2 are fastened by the fastening bands 15, 16, 25, 26, 35, 36, 45, 46, 65 and 66, the fastening members, that is, the second fastening members comprised of the fastening bands 16, 26, 36, 46 and 66 and the first fastening members comprised of the fastening bands 15, 25, 35, 45 and 65 are not limited in configuration to the ones explained above. In the above embodiment (first specific example), the replacement cables CA3 (CA21, CA22) are fastened at the same position (third position P3) in the first aspect including the replacement cables CA3 in the option cables CA2 (FIG. 7) and the second aspect including the replacement cables CA3 in the basic cables CA1 (FIG. 8). Here, although part of the option cables CA2 are made replacement cables CA3 (replacement umbilical members), all of the option cables CA2 may also be made replacement umbilical members. Alternatively, part or all of the basic cables CA1 may be made replacement umbilical members.

The above embodiments and one or more of the modifications can be freely combined.

According to the present invention, the first fastening part which fastens the first umbilical members and the second fastening part which fastens the second umbilical members are designed to be respectively attached to the base part, so umbilical members can be easily detached from the robot. Further, the second fastening part has an attachment member attached to the base part and a fastening member which fastens the second umbilical members to the attachment member. The attachment member is provided detachably from the base part in the state where the first umbilical members are fastened by the first fastening part, so the work for replacement of the second umbilical members is also easy.

Above, while the invention has been described with reference to specific preferred embodiments, it will be understood, by those skilled in the art, that various changes or modifications may be made thereto without departing from the scope of the following claims.

The invention claimed is:

1. A robot, comprising:
    a first member and a second member which rotate relative to each other;
    a plurality of umbilical members including a first umbilical member and a second umbilical member and having:
        movable portions movable between the first member and the second member, and
        each of the plurality of umbilical members having a nonmoving portion fixed on the first member; and
        a pair of umbilical member attachment devices attached to the first member and the second member, respectively;
    a servo motor driving the robot; and
    a power supply supplying power for maintaining positional information of the servo motor,
    wherein each of the pair of umbilical member attachment devices comprises:
        a base part attached detachably to the first member or the second member;
        a first fastening part attached to the base part to fasten the first umbilical member; and
        a second fastening part attached to the base part to fasten the second umbilical member,
        wherein the second fastening part has an attachment member attached to the base part and a fastening member fastening the second umbilical member to the attachment member, and
        wherein the attachment member is provided detachably from the base part together with the second umbilical member in a state where the first umbilical member is fastened by the first fastening part,
    wherein the first umbilical member includes a power line and a signal line to the servo motor, and
    wherein the second fastening part fastens the second umbilical member in a manner detachable from the robot in a state where the servo motor and the power supply are connected.

2. The robot according to claim 1,
    wherein the first fastening part has a first attachment member attached to the base part and a first fastening member fastening the first umbilical member to the first attachment member,
    wherein the attachment member and the fastening member of the second fastening part are respectively a second attachment member and a second fastening member, and
    wherein the second attachment member is provided detachably from the base part together with the second umbilical member in a state where the first attachment member is attached to the base part, while the first attachment member is provided detachably from the base part together with the first umbilical member in a state where the second attachment member is attached to the base part.

3. The robot according to claim 2,
    wherein the first attachment member and the second attachment member are arranged adjoining each other in a direction vertical to a longitudinal direction of the plurality of umbilical members.

4. The robot according to claim 1, further comprising a third fastening part attached to the base part to fasten the first umbilical member and the second umbilical member.

5. The robot according to claim 1,
wherein the plurality of umbilical members include a replacement umbilical member fastened to one of the first fastening part and the second fastening part, and
wherein the replacement umbilical member is fastened to a predetermined position by the first fastening part in a first mode and is fastened to the same predetermined position by the second fastening part in a second mode.

6. The robot according to claim 1, further comprising a first distribution board to which the first umbilical member is connected and a second distribution board to which the second umbilical member is connected.

7. The robot according to claim 1, further comprising a cover covering the movable portions of the plurality of umbilical members.

8. The robot according to claim 1, further comprising a pipe part arranged along an axial line, the axial line being a center of rotation of the first member and the second member,
wherein the plurality of umbilical members are passed through an inside of the pipe part.

* * * * *